(12) United States Patent
Osborn

(10) Patent No.: US 11,598,377 B2
(45) Date of Patent: Mar. 7, 2023

(54) MOTOR SHAFT ADAPTER

(71) Applicant: KISS ENGINEERING, LLC., Solon, OH (US)

(72) Inventor: Merritt A. Osborn, Chagrin Falls, OH (US)

(73) Assignee: KISS ENGINEERING, LLC, Solon, OH (US)

( * ) Notice: Subject to any disclaimer, the term of this patent is extended or adjusted under 35 U.S.C. 154(b) by 846 days.

(21) Appl. No.: 16/548,155

(22) Filed: Aug. 22, 2019

(65) Prior Publication Data

US 2020/0063801 A1    Feb. 27, 2020

Related U.S. Application Data

(60) Provisional application No. 62/721,159, filed on Aug. 22, 2018.

(51) Int. Cl.
*F16D 3/06* (2006.01)
*F16B 5/02* (2006.01)

(52) U.S. Cl.
CPC .................. *F16D 3/06* (2013.01); *F16B 5/02* (2013.01); *F16D 2250/0084* (2013.01); *F16D 2300/12* (2013.01)

(58) Field of Classification Search
CPC ... F16D 3/06; F16D 3/18; B62D 1/185; F16H 55/56; Y10T 403/66; Y10T 403/7117; Y10T 403/7045
See application file for complete search history.

(56) References Cited

U.S. PATENT DOCUMENTS 2,321,438 A * 6/1943 Duke ...................... F16H 55/56
474/46

FOREIGN PATENT DOCUMENTS

GB          983359 A  *  2/1965

* cited by examiner

*Primary Examiner* — Jason L Vaughan
*Assistant Examiner* — Amanda Kreiling
(74) *Attorney, Agent, or Firm* — Daugherty & Del Zoppo, Co. LPA

(57) ABSTRACT

Motor shaft adapters include a cylindrical shaft sleeve with a tubular body defined between inner and outer cylindrical surfaces, and frame adapters that include a section of structural tubing and flanges having sides aligned to the sides of the structural tubing section and fixed at respective ends of the section of structural tubing into assembly between a motor and gearhead. Key slot apertures are defined by opposing body end-walls of the tubular body and through the inner and outer cylindrical surfaces of the sleeve. A shaft key has outer sidewalls that include opposing outer sleeve aperture sidewall portions that enable the shaft key sidewall portions to fit within and to thereby engage the sleeve via the key slot aperture. The key sidewalls further include a base pair of opposing key seat engagement portions that fit within and engage opposing sidewalls of a key seat aperture defined within a workpiece shaft.

18 Claims, 15 Drawing Sheets

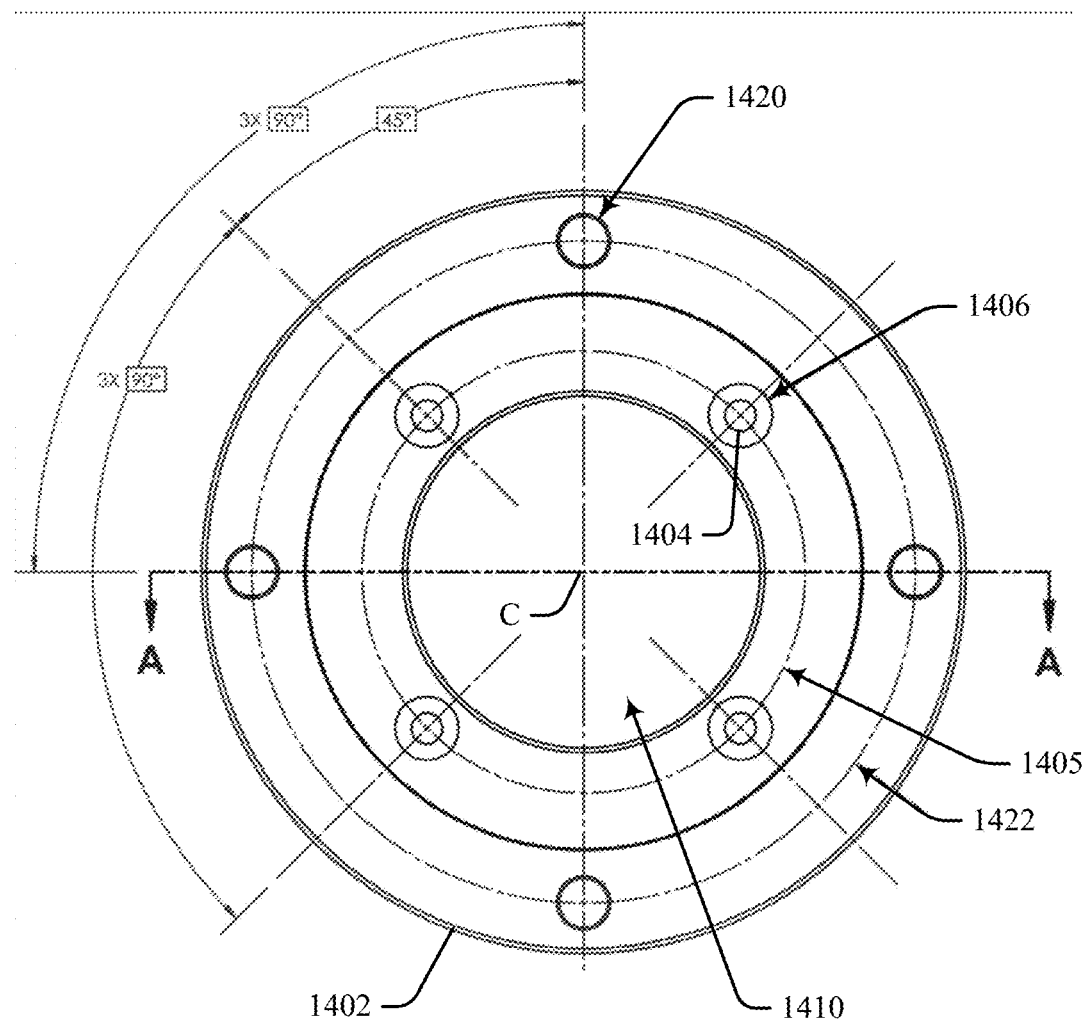
FIG 11A
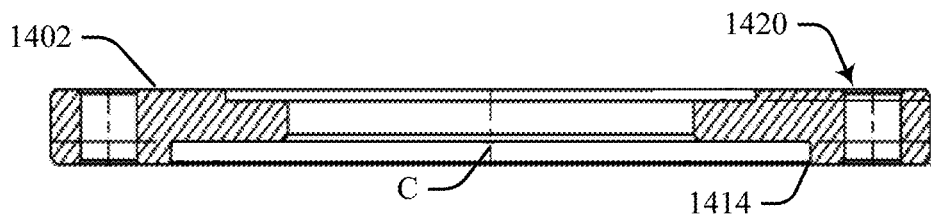
FIG 11B    SECTION A-A

MOTOR SHAFT ADAPTER

BACKGROUND

Motor mounting adapters are generally designed to convert motor mount spacing holes from one frame size to another. They may compensate for differences in mounting hole locations and shaft height without altering motor axial centerline or end of shaft extension dimensions.

In a keyed-joint system or structure a machined key element fits within and is engaged by key-way and key seat structures, sometimes referred to as slot and pocket structures, that are formed within respective shaft and rotating machine elements. Engagement with the key via the keyway and key seat structures prevents relative rotation between the shaft and rotating element, enabling torque transmission between the shaft and rotating machine element, while in some arrangements allowing relative axial movement between the shaft and rotating element. Keyed rotating machine elements include gears, pulleys, couplings, and other structures incorporated within speed and torque transmission systems that transform input speed and torque of rotating keyed motor shafts into different output values.

Efficient and acceptable performance in transforming input speed and torque may be dependent upon aligning keyed shaft and rotating elements. For an electric motor driver or turbine shaft coupled via a keyed joint system to a rotating machine element of a pump, generator, or other piece of equipment, it is generally important that the respective mating shaft elements of the two pieces are aligned to within a tolerated or satisfactory margin of precision. Misalignment between the two may increase stress on the shafts and result in excessive wear and premature breakdown of the equipment, or damage to bearings or mechanical seals. Misalignment can also cause increased vibration and loads on the machine parts for which they have not been designed (i.e. improper operation).

Where alignment is not achieved within demanded specifications, a variety of shaft misalignment conditions may occur. In a parallel misalignment, the center lines of both shafts are parallel, but they are offset. In an angular misalignment, the shafts are at an angle to each other. Parallel misalignment also comprehends horizontal misalignment (misalignment of the shafts in the horizontal plane) and vertical misalignment (misalignment of the shafts in the vertical plane). Parallel horizontal misalignment refers to movement of a motor shaft horizontally away from a pump shaft, but wherein both shafts are still in a same horizontal plane and parallel to each other. Parallel vertical misalignment refers to movement of a motor shaft vertically away from a pump shaft, but wherein shafts are still in a same vertical plane and parallel to each other.

Angular misalignment refers to configurations wherein a motor shaft is located at an angle with respect to the pump shaft but both shafts are still in a same horizontal plane (an "angular horizontal misalignment"), or in a same vertical plane (an "angular vertical misalignment"). Thus, common errors of alignment comprehend parallel misalignment, angular misalignment or a combination of the two.

SUMMARY

Apparatuses are provided that include a cylindrical shaft sleeve with a tubular body defined between an inner cylindrical surface and an outer cylindrical surface; a key slot aperture defined by opposing body end-walls of the tubular body and through the inner cylindrical surface and the outer cylindrical surface; a shaft key including outer sidewalls, wherein the outer sidewalls comprise a pair of opposing outer sleeve aperture sidewall portions that are located a sleeve aperture width apart that is selected to enable the shaft key outer sleeve aperture sidewall portions to fit within the sleeve key slot aperture and to thereby engage the opposing body end-walls of the sleeve key slot aperture; and wherein shaft key outer sidewalls further include a base pair of opposing key seat engagement portions that are located a key seat width apart that is selected to enable the base pair of opposing key seat engagement portions to fit within opposing sidewalls of a key seat aperture that is defined within a workpiece motor shaft located within the cylindrical shaft sleeve tubular body and to thereby engage the opposing sidewalls of the workpiece shaft key seat aperture.

Some apparatuses also include a flange attached to one of the workpiece gearhead and the workpiece motor; a section of structural tubing that is disposed about the cylindrical shaft sleeve, the shaft key, the key body, the workpiece motor shaft and the rotating machine element; the structural tubing having an edge face; and a recessed pocket defined on a face of the flange comprising inner edge walls that engage form elements of the structural tubing edge face within a specified tolerance, said engagement transferring rotational torque forces between the flange and the structural tubing imparted to either of the structural tubing section and the flange from the output torque of the workpiece shaft.

Methods include, within a cylindrical shaft sleeve comprising a tubular body defined between an inner cylindrical surface and an outer cylindrical surface, defining a key slot aperture within opposing body end-walls of the tubular body and through the inner cylindrical surface and the outer cylindrical surface; a shaft key comprising outer sidewalls engaging opposing body end-walls of the sleeve key slot aperture, wherein the outer sidewalls comprise a pair of opposing outer sleeve aperture sidewall portions that are located a sleeve aperture width apart that enables the shaft key outer sleeve aperture sidewall portions to fit within the sleeve key slot aperture; and fitting a base pair of opposing key seat engagement portions of the shaft key outer sidewalls that are located a key seat width apart within opposing sidewalls of a key seat aperture that is defined within a workpiece motor shaft located within the cylindrical shaft sleeve tubular body, the base pair of opposing key seat engagement portions thereby engaging the opposing sidewalls of the workpiece shaft key seat aperture.

Methods also include attaching a flange to one of the workpiece gearhead and the workpiece motor; disposing a section of structural tubing about the cylindrical shaft sleeve, the shaft key, the key body, the workpiece motor shaft and the rotating machine element, the structural tubing having an edge face defined by form elements; a recessed pocket defined on a face of the flange comprising inner edge walls engaging the form elements of the structural tubing edge face within a specified tolerance; and the engaging the form elements transferring rotational torque forces between the flange and the structural tubing imparted to either of the structural tubing section and the flange from the output torque of the workpiece shaft.

BRIEF DESCRIPTION OF THE DRAWINGS

These and other features of embodiments of the present invention will be more readily understood from the following detailed description of the various aspects of the invention taken in conjunction with the accompanying drawings in which:

FIG. 11A is a back view of a generally circular flange according to the present invention.

FIG. 11B is a sectional view of the flange of FIG. 11A.

DETAILED DESCRIPTION

Figure 1:
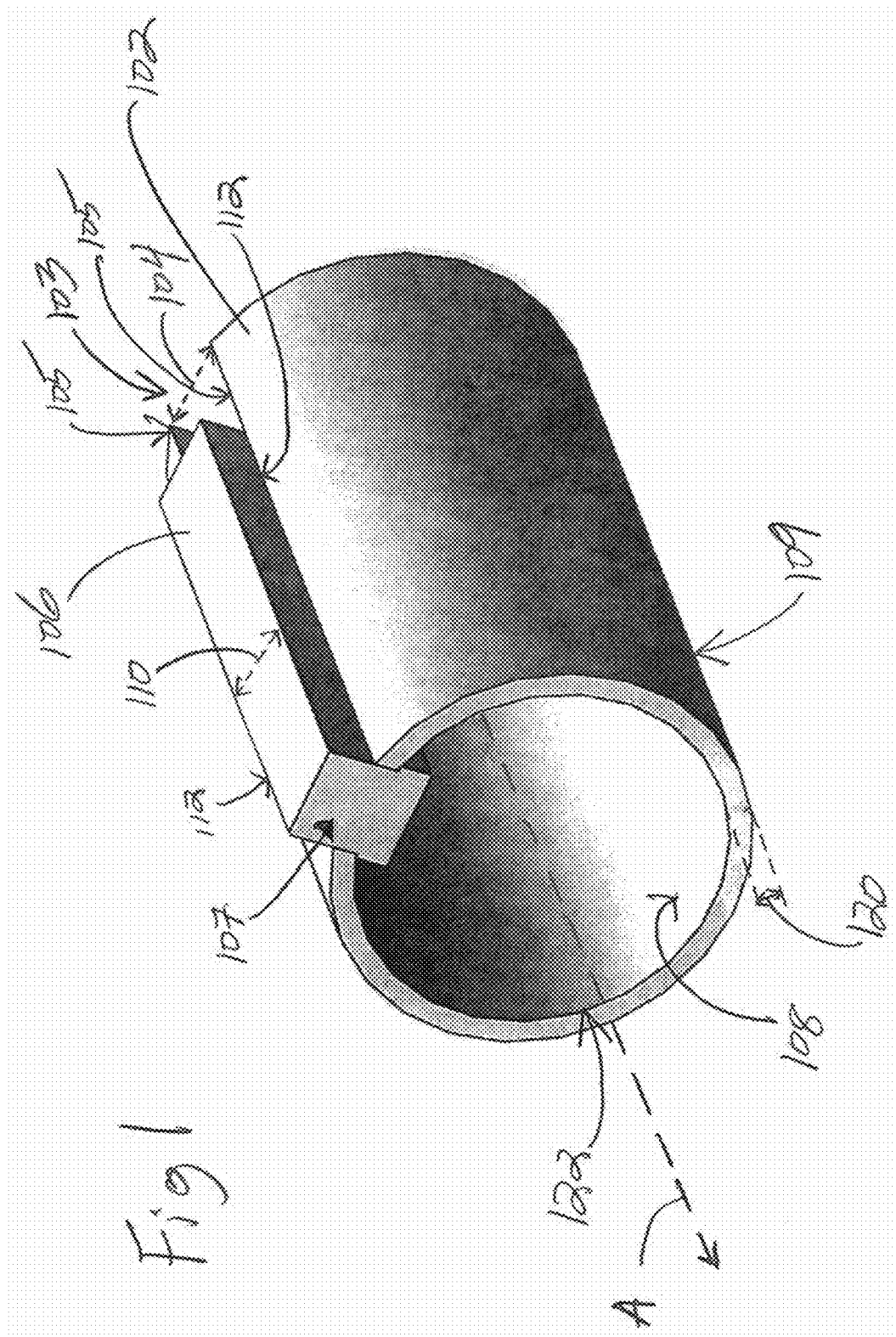
FIG. 1 is a perspective illustration of an embodiment according to the present invention.

FIG. 1 is a perspective view of a motor shaft adapter system according to the present invention that is configured to adapt a smaller keyed motor shaft to a larger bore keyed rotating machine element. A cylindrical shaft sleeve 102 forms a key-way slot aperture 103 configured for receipt of a key 106 having a generally rectangular or square cross-sectional shape or profile 107. The slot aperture 103 has a width dimension 104 defined between inner opposing body end-walls 105 that is selected to match, within a specified tolerance, a width dimension 110 defined by opposing outer side-walls 112 of the key cross-sectional shape/profile 107, thereby enabling the key 106 to fit within the aperture 104 and to project above and below inner and outer surfaces of the shaft sleeve 102 and thereby into key seats within each of a workpiece motor shaft and a workpiece rotating machine element that are engaged by the shaft sleeve 102.

The shaft sleeve 102 has an inner cylindrical surface 108 that defines a central cylindrical aperture 122 having a first radius dimension from a central cylindrical axis of the sleeve 102 that is selected to correspond to the radius of an outer cylindrical surface of a workpiece motor shaft (not shown), within a specified or acceptable tolerance, so that the sleeve 102 inner cylindrical surface 108 fits over and engages the cylindrical outer surface of the workpiece motor shaft.

An outer cylindrical surface 109 of the sleeve 102 is defined on a larger, second radius from the central cylindrical axis A, giving the sleeve 102 a tubular shape having a width dimension 120 defined by the difference between first and second radius dimension values of the respective inner cylindrical surface 108 and outer cylindrical surface 109. The larger, second radius dimension of the outer cylindrical surface 109 is selected to align the outer cylindrical surface 109 to correspond to the radius of an inner (internal boring) cylindrical surface of a workpiece rotating machine element (not shown) (for example, pulley, sprocket, reducer, etc.) within a specified or acceptable tolerance, so that the sleeve 102 outer cylindrical surface 109 fits within and engages the inner cylindrical surface of the workpiece rotating machine element.

In the present embodiment, the width dimension 110 defined by the opposing outer side-walls 112 of the key cross-sectional shape/profile 107 is selected to fit within corresponding key seat structures (not shown) defined within each of the workpiece shaft outer cylindrical surface and the workpiece rotating machine element inner cylindrical surface, so that, via engagement with said respective seat structures, the key 106 transmits input speed and torque from the rotating workpiece shaft to the workpiece rotating machine element, as will be readily appreciated by one skilled in the art. The sleeve 102 tubular shape width dimension 120 is selected to correspond to (for example, to equal within a specified tolerance) a difference between the respective radius dimensions of the outer cylindrical surface of the workpiece motor shaft and the inner cylindrical surface of the workpiece rotating machine element, to eliminate misalignment or other performance problems that would otherwise arise between differences in these dimensions during speed or torque transmission operations.

Figure 2:
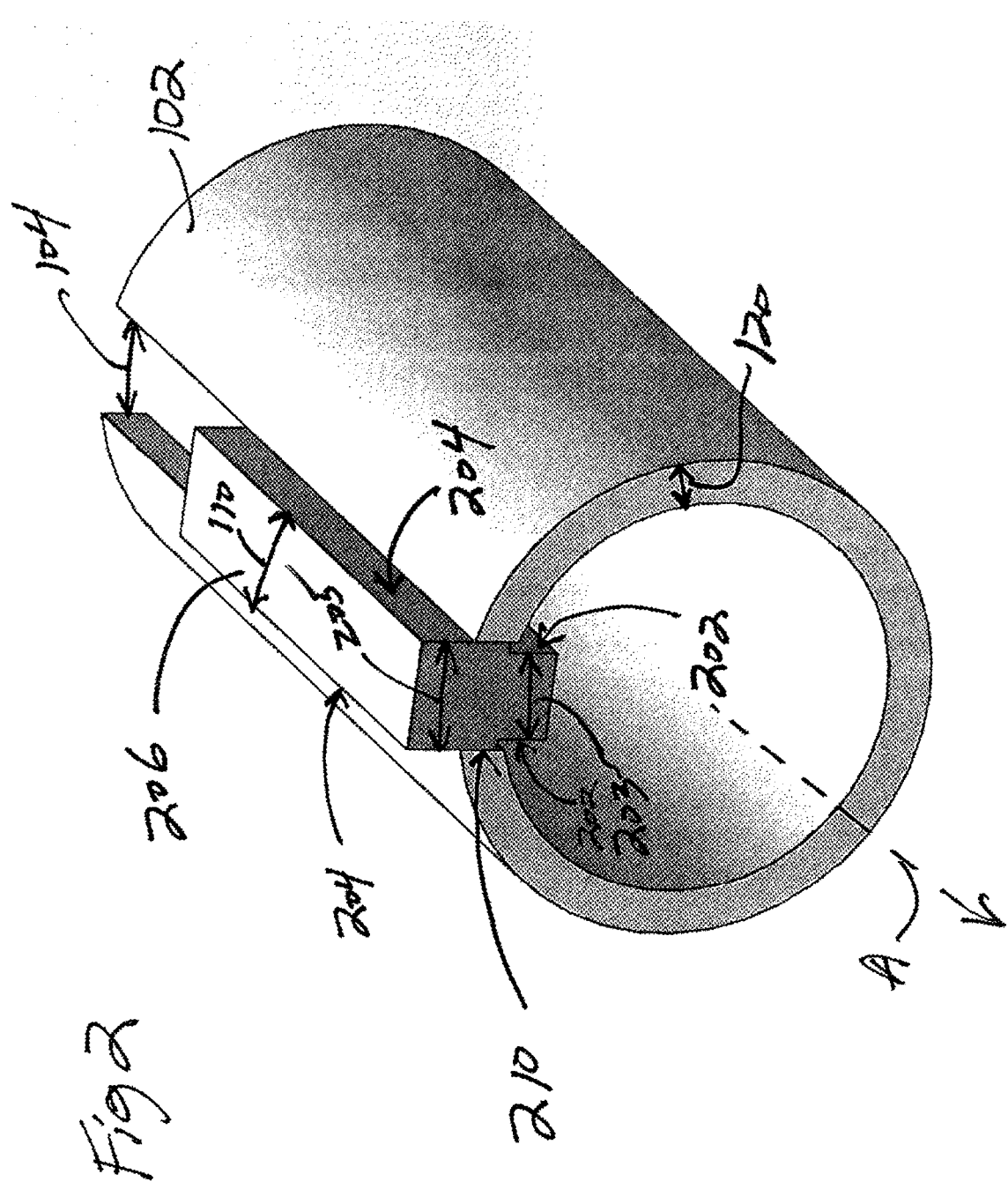
FIG. 2 is a perspective illustration of another embodiment according to the present invention.

FIG. 2 illustrates another embodiment of the present invention that is configured to adapt a smaller keyed motor shaft to a larger bore keyed rotating machine element, wherein the key seat structure defined in the motor shaft is sized for a smaller key relative to the key seat structure defined in the motor shaft rotating machine element. More particularly, a stepped key 206 is shown disposed within the sleeve 102 of FIG. 1 as described above. (However, one skilled in the art will appreciate that other sleeves having other dimensions may be practiced with the stepped key 206, and the present example is not limiting to practice with the specific sleeve 102). The stepped key 206 has a stepped cross-sectional shape/profile 210 defined by different upper outer side wall portions 204 and lower outer side wall portions 202. The upper outer side wall portions 204 are defined on the width dimension 205, thereby enabling the upper outer side wall portions 204 of the key 206 to fit within the aperture 104 of the sleeve 102, and to fit within a corresponding key seat structure (not shown) defined within a workpiece rotating machine element inner cylindrical surface (not shown), as described above with respect to the embodiment of FIG. 1.

The stepped key lower outer side wall portions 202 are defined on a smaller width dimension 203 relative to width dimension 205, thereby enabling the lower outer side wall portions 202 of the stepped key 206 to fit within a corresponding, different (smaller) key seat structure (not shown) defined within a workpiece shaft outer cylindrical surface. Thus, via engagement with said respective seat structures, the stepped key 206 transmits input speed and torque from the rotating workpiece shaft to the workpiece rotating machine element, wherein the sleeve 102 tubular shape width dimension 120 is selected to correspond to (for example, to equal within a specified tolerance) a difference between the respective radius dimensions of the outer cylindrical surface of the workpiece motor shaft and the inner cylindrical surface of the workpiece rotating machine element, to eliminate misalignment or other performance problems that would otherwise arise between differences in these dimensions during speed or torque transmission operations.

In some embodiments, the keys 106 and 206 have length dimensions (relative to axis A) that are shorter than the length dimension of the sleeve 102. This enables the keys 106 and 206 to fit and align within each of the respective seat structures of the workpiece shaft and rotating elements in a finished assembly, and efficient formation and disassembly of the coupled shaft and rotating element while maintaining alignment of the workpieces relative to each during speed and torque transmission operations.

One illustrative but not limiting or exhaustive example of the embodiment of FIG. 2 is designed to "step up" a keyed shaft one motor size, relative to the engaged rotating element, and thereby adapt 1⅛ inch sleeve and key application seat to a ⅜ inch sleeve and key seat application, wherein in one example of the embodiment of FIG. 2 the first radius dimension of the inner cylindrical surface 108 is 1.125 inches (with a tolerance of plus or minus 0.005 inches); the second radius dimension of the outer cylindrical surface 109 is 1.375 inches (with a tolerance of plus or minus 0.005 inches); and the stepped key 206 has a length dimension (along axis A) of 1.75 inches, and the sleeve a length dimension of 2.75 inches. In one example, the width dimension 205 of the upper outer side wall portions 204 of the stepped key 206 is 0.313 inches (with a tolerance of plus or minus 0.002 inches); the width dimension 203 of the lower outer side wall portions 202 is 0.25 inches (with a tolerance of plus or minus 0.002 inches); an overall height dimension encompassing upper and lower wall portions 204 and 202 of 0.403 inches (with a tolerance of plus or minus 0.002 inches), wherein the lower wall portions 202 have a height of 0.141 inches (with a tolerance of plus or minus 0.002 inches).

Figure 3:
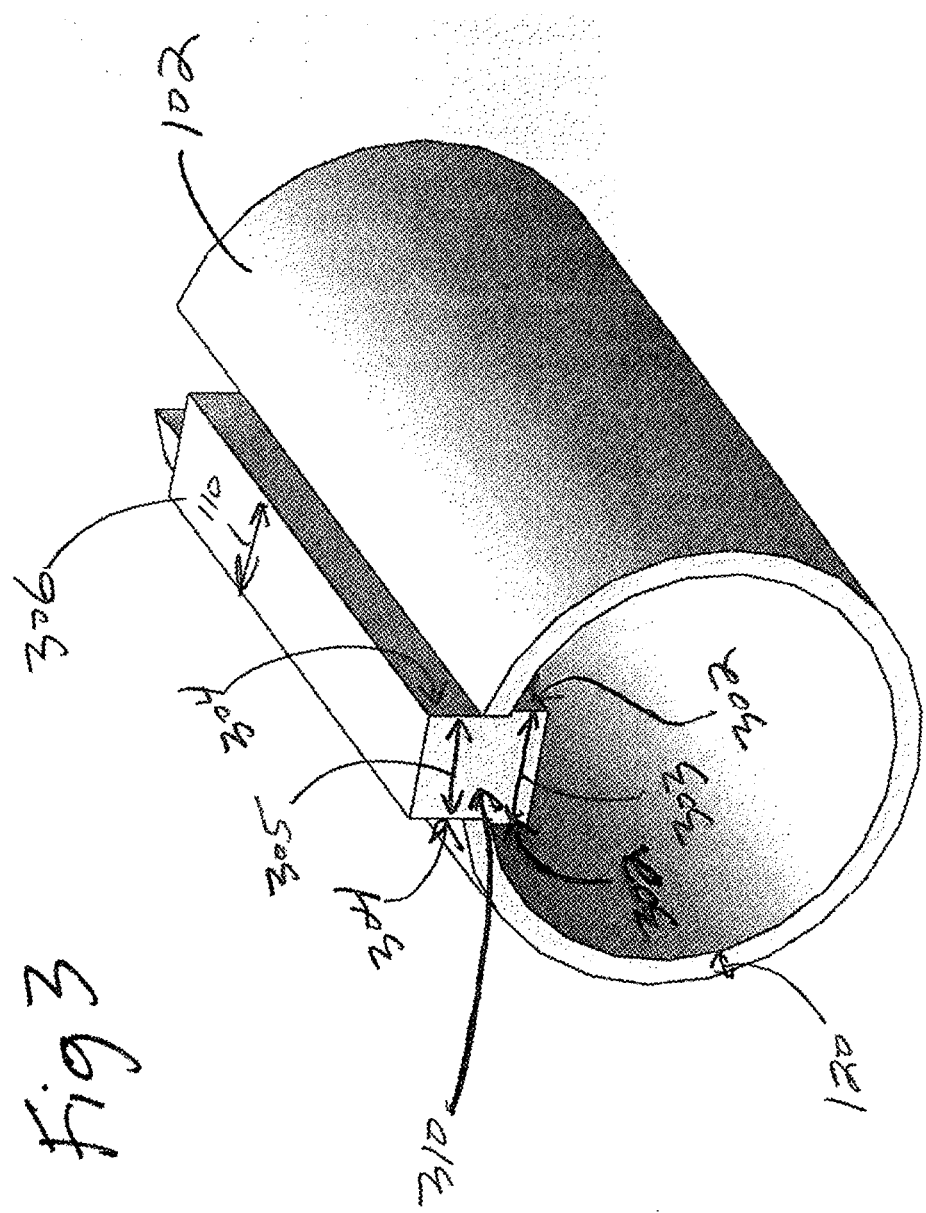
FIG. 3 is a perspective illustration of another embodiment according to the present invention.

FIG. 3 illustrates another embodiment of the present invention configured to form a connection between a 48-millimeter (mm) motor shaft and 2⅛-inch keyed rotating element disposed thereabout. Thus, a stepped key 306 has a stepped cross-sectional shape/profile 310 defined by upper outer side wall portions 304 that define a smaller outer width dimension 305 relative to the outer width dimension 303 of the lower outer side wall portions 302 that are configured to fit the keyed seat of the 48-millimeter motor shaft. In one example of the embodiment of FIG. 3, the first radius dimension of the inner cylindrical surface 108 is 1.890 inches (with a tolerance of plus or minus 0.005 inches); the second radius dimension of the outer cylindrical surface 109 is 2.125 inches (with a tolerance of plus or minus 0.005 inches); the stepped key 306 has a length dimension (along axis A) of 3.150 inches (80 millimeters), and the sleeve a length dimension of 4.0 inches; the width dimension 305 of the upper outer side wall portions 304 is 0.50 inches (with a tolerance of plus or minus 0.005 inches); and the width dimension 303 of the lower outer side wall portions 302 is about 14 mm or 0.551 inches (with a tolerance of plus or minus 0.005 inches), for a difference of 0.26 inches (with a tolerance of 0.001 inches) relative to the width dimension 305; an overall height dimension encompassing upper and lower wall portions 304 and 302 of 0.554 inches (with a tolerance of plus or minus 0.005 inches), wherein the upper wall portions 304 have a height of about 0.384 inches (with a tolerance of plus or minus 0.002 inches).

Figure 4:
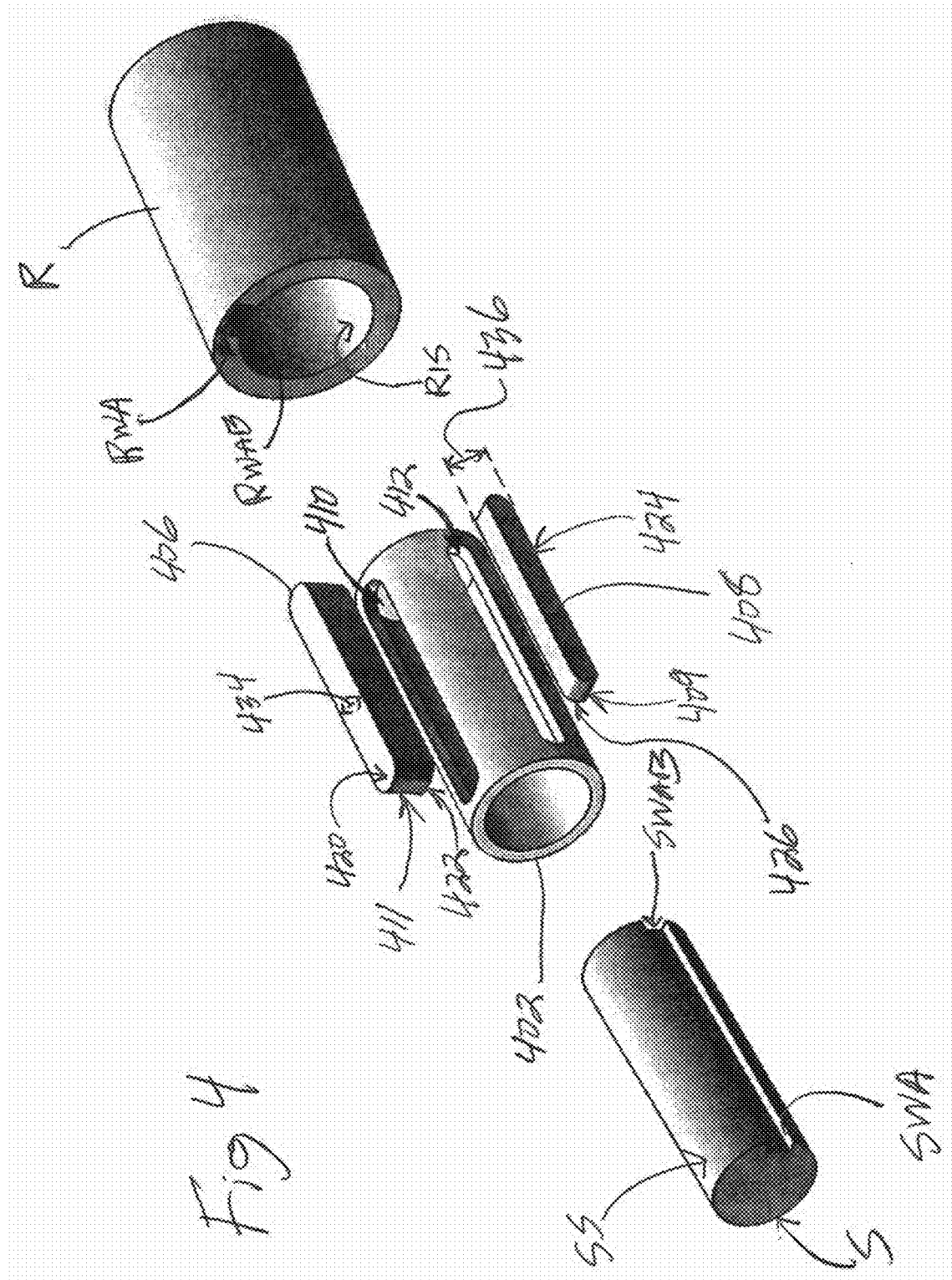
FIG. 4 is an exploded perspective illustration of another embodiment according to the present invention.

FIG. 4 is an exploded assembly illustration of another embodiment of the present invention that comprises a (first) internal-shaft key 406 and a different (second) external-shaft key 408 that are each configured to fit within respective corresponding apertures 410 and 412 defined within a sleeve 402, in order to adapt a first, externally-keyed workpiece motor shaft S to a second, internally-keyed workpiece shaft R that defines an internal aperture for acceptance of other shaft elements that has a larger bore dimension than an outer diameter surface of the first shaft S. Thus, key 408 has a sidewall wall profile 409 that is configured to conform to (or to fit within, pursuant to a required or specified tolerance) corresponding sidewall structures SWA defining a key seat structure in the first externally-keyed workpiece motor shaft S. Key 406 has a sidewall wall profile 411 that is configured to conform to (or to fit within, pursuant to a required or specified tolerance) corresponding sidewall structures RWA defining a key seat structure in the second, large-bore internally-keyed shaft R.

The two keys 406 and 408 are held into place within their respective workpiece key seats SWA and RWA in a final assembly via engagement with opposing workpiece surfaces. More particularly, in the final assembly the key 408 is held within the sleeve aperture 412 (via engagement of the key profile sidewalls 409 with corresponding sidewall structures defining the aperture 412 within the sleeve 402) and engages the first externally-keyed shaft key seat SWA, wherein a lower engagement surface 426 of the key 408 is brought into contact with a base surface SWAB of the shaft key seat SWA and a cylindrical upper engagement surface 424 of the key 408 is brought into contact with a corresponding internal cylindrical surface RIS of the second, internally-keyed shaft R, said engagement surfaces 426 and 424 thereby operating to keep the key 408 seated within the first shaft key seat SWA.

In a corresponding fashion the key 406 is held within the sleeve aperture 410 (via engagement of the key profile sidewalls 411 with corresponding sidewall structures defining the aperture 410 within the sleeve 402) and engages the second shaft key seat RWA, wherein an upper engagement surface 420 of the key 406 is brought into contact with a base surface RWAB of the second shaft key seat RWA and a cylindrical lower engagement surface 422 of the key 406 is brought into contact with a corresponding external cylindrical surface SS of the first shaft S, said engagement surfaces 420 and 422 thereby operating to keep the key 406 seated within the rotating machine element key seat RWA.

Thus, the embodiment of FIG. 4 enables the use of keys 406 and 408 that each have different respective outer wall profile dimensions 409 and 411 to engage different key seat sizes as needed. In the present example, the apertures 410 and 412 are located 90 degrees from each other relative to a central axis of the sleeve 402, though other placements may be practiced. Some embodiments of the sleeve 402 may have more than two key apertures of different sizes for use with different keys as needed to correspond to a variety of different key seat dimensions within the internal-bore and external surface key seat structures of shafts and rotating machine elements, as will be apparent to one skilled in the art.

The embodiment of FIG. 4 provides improved resilience to shear forces relative to teachings of the prior art. More particularly, the sum of respective width dimensions 434 and 436 of the two keys 406 and 408 present a correspondingly larger overall combined material width dimension relative to the width of either single key structures deployed as a single key as taught in prior art adapter systems. This larger, composite width dimension presents correspondingly more material resistance to shear forces imparted rotationally upon the two keys 406 and 408 around the central axis of the sleeve 402 from engagement of the respective key profile sidewalls 409 and 411 (as described above) during translation of rotational forces (torque) between the first shaft S and the second shaft R, in proportion to the amount that this composite width dimension exceeds the width of any single key used in a prior art adaptor. For example, a key 406 having a width dimension 434 of ⅝ inches and a key 408 having a width dimension 436 of ¼ inches present a composite key width dimension of ⅞ inches, presenting a proportionally greater shear force resistance that than presented by a prior art system using a single key having a similar width dimension to either of the keys 406 and 408 (which is necessarily less than said composite width), or otherwise having a width dimension smaller than said composite width dimension. Accordingly, embodiments of the present invention may select of utilize different width dimensions 434 and 436 to generate a minimum desired composite width dimension that presents requisite shear force resistance: where one of the dimensions is dictated by the slot dimensions of a given one of the shafts S and R, the other may be increased (and the slot dimensions adjusted as needed within the remaining other of the shafts S and R to accommodate the enlarged one of the key width dimensions 434 and 436), in order to provide an increased composite key width dimension.

Embodiments of the present invention enable a user to adapt a keyed motor shaft having an outside cylindrical diameter surface intended for engagement and use with another internally-bored shaft or rotating machine element that is bored for a larger shaft diameter. Aspects thereby accommodate relative differences in sizes and dimensions within common measurement standards (for example, inch or metric-based dimensions), adapt one standard to another (for example, from inch to metric, or metric to inch dimensions), and may further adapt between different standards (for example, between IEC and National Electrical Manufacturers Association (NEMA) dimensions and standards).

The embodiments of FIGS. 1 through 4 are generally configured to adapt and move-up one size, wherein a single sleeve element is configured with a tubular width dimension to bridge between the one-size step-up. Larger or more complex differences may also be present between the outside cylindrical diameter surface of a keyed motor shaft workpiece and another, internally-bored shaft or rotating machine element workpiece for which connection (adaption) via embodiments of the present invention is required. For example, multiple step-ups in size may be required, and/or an additional or further conversion/translation between different dimension standards (mm-to-inch, NEMA-to-IEC, etc.).

Figure 5:
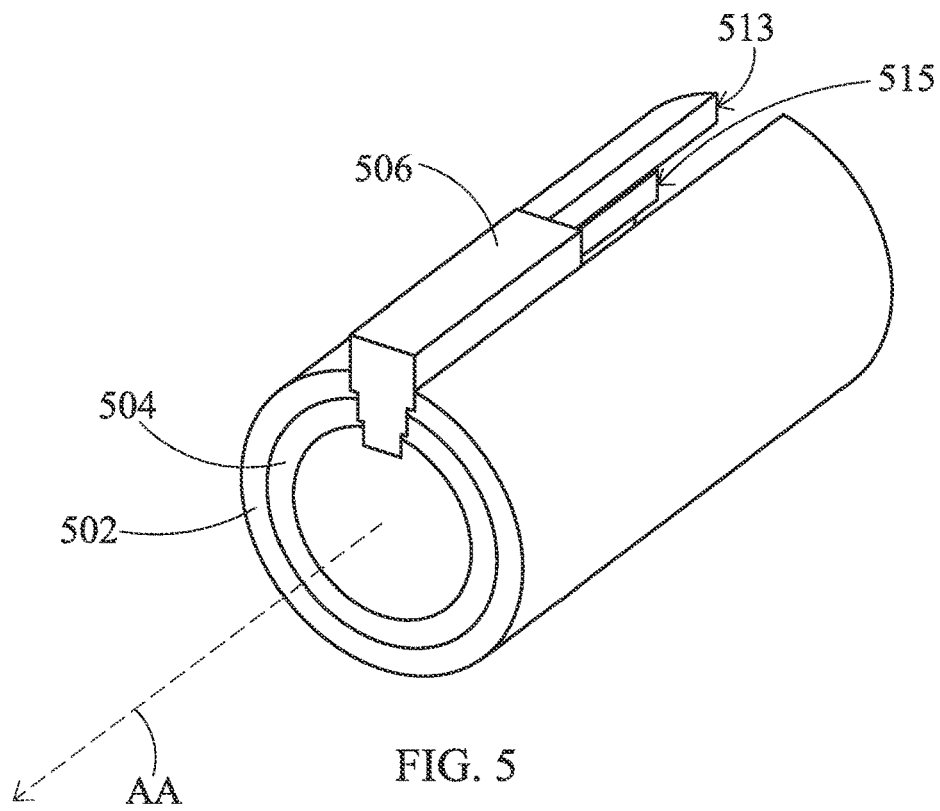
FIG. 5 is a perspective illustration of another embodiment according to the present invention.

Accordingly, FIG. 5 is perspective illustration of another embodiment of the present invention that is configured to step-up or otherwise adapt the outer diameter and keyed-seat dimensions of a keyed motor shaft workpiece two-steps to the larger-bored, interior cylindrical surface of another internally-bored and keyed shaft or rotating machine element. In assembly one sleeve 502 is disposed about another sleeve 504, each having tubular shapes defined by respective interior and exterior cylindrical surfaces that are defined by different respective radial distances from a common assembly axis AA, wherein the interior cylindrical surface dimension of the outer sleeve 502 is selected to match and thereby fit about the exterior cylindrical surface dimension of the inner sleeve 504 with a desired or required tolerance. The thickness of each of the sleeves 502 and 504 (as defined by differences between their respective interior and exterior cylindrical surfaces) is selected to step-up one dimensional size, or to adapt between different IEC or NEMA dimensions, etc., to thereby allow for differences in both size or dimensional standards.

Figure 6:
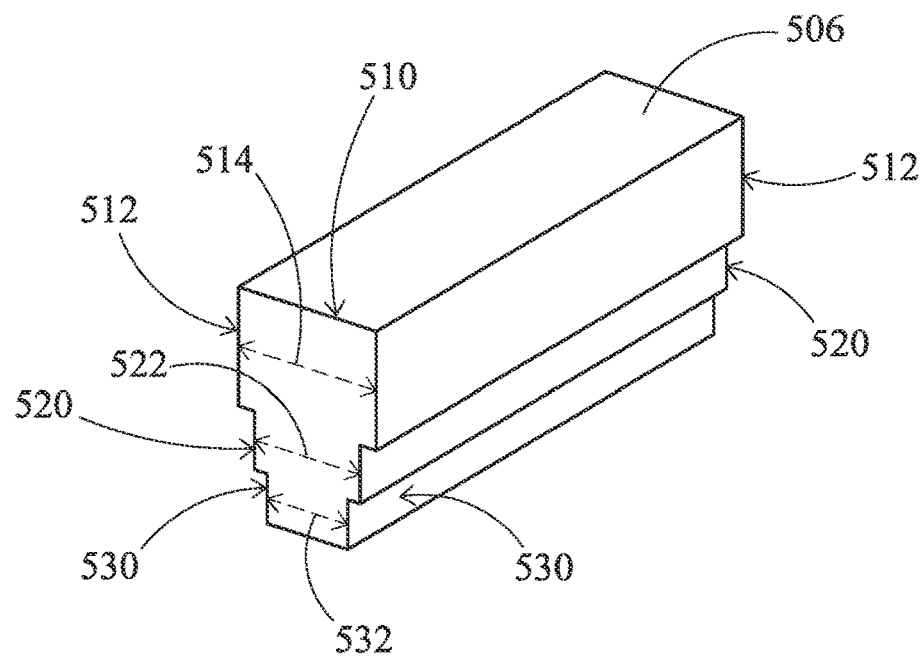
FIG. 6 is a perspective illustration of another embodiment according to the present invention.

With reference to both FIG. 5 and FIG. 6, a three-step key 506 is configured with three different sets (or steps) of paired sidewalls, presenting a stepped cross-sectional shape/profile 510 defined by: an upper-most pair of outer side wall portions 512 located a width dimension 514 apart that is selected to within an aperture of the outer sleeve 502 that is defined by opposing end/sidewalls 513 of the sleeve 502, and to fit within a corresponding key seat structure (not shown) defined within a workpiece internally-bored shaft or rotating machine element inner cylindrical surface (not shown), as described generally above with respect to the embodiments of FIGS. 1-4; a middle pair of outer side wall portions 520 located a width dimension 522 apart that is selected to fit within an aperture of the inner sleeve 504 that is defined by opposing end/sidewalls 515 of the inner sleeve 504; and a lower pair of outer side wall portions 530 located a width dimension 532 apart that is selected to fit within a corresponding key seat structure (not shown) defined within a workpiece keyed-shaft (not shown), as described generally above with respect to the embodiments of FIGS. 1-4.

Pursuant to the assembly of FIG. 5, via engaging the respective workpiece seat structures the stepped key 506 transmits input speed and torque from the rotating workpiece shaft to the workpiece rotating shaft or machine element, as will be readily appreciated by one skilled in the art. The sleeve 502 and 504 tubular shape width dimensions are selected to correspond to (for example, to equal within a specified tolerance) difference between respective radius dimensions of cylindrical surfaces of each other and of the workpiece motor shaft and the inner cylindrical surface of the workpiece rotating shaft or machine element, to eliminate misalignment or other performance problems that would otherwise arise between differences in these dimensions during speed or torque transmission operations.

One illustrative but not limiting or exhaustive example of the embodiment of FIG. 5 is designed to "step up" an input motor keyed shaft workpiece having a ⅞-inch outer diameter two sizes, to engage another workpiece shaft or rotating element having an internally-bored diameter of 1⅜ inch and a key seat formed therein. Thus, the inner sleeve 504 has an inner diameter surface located on about a ⅞-inch diameter (wherein the dimension is selected to form an acceptable engagement, within tolerance, with the outer surface of the workpiece shaft) and an outer surface located on a 1⅛-inch diameter, which is conventionally one size or "step" up from a ⅞-inch diameter shaft size in NEMA standards. The outer sleeve 502 has an inner diameter surface located on about an 1⅛-inch diameter dimension (wherein the dimension is selected to form an acceptable engagement, within tolerance, with the outer surface of the inner sleeve 504), and an outer surface located (within specified tolerance) on a NEMA standard located on a 1⅜-inch diameter, to correspond to and engage the internally-bored cylindrical aperture of the workpiece shaft or rotating element. In this example, the upper-most pair of outer side wall portions 512 of the two-step key 506 are located apart a width dimension 514 of about 0.313 inches; the middle pair wall portion 520 are located apart a width dimension 522 of about 0.25 inches; and the lower pair of outer side wall portions 530 are located apart a width dimension 532 of 0.19 inches.

Figure 7:
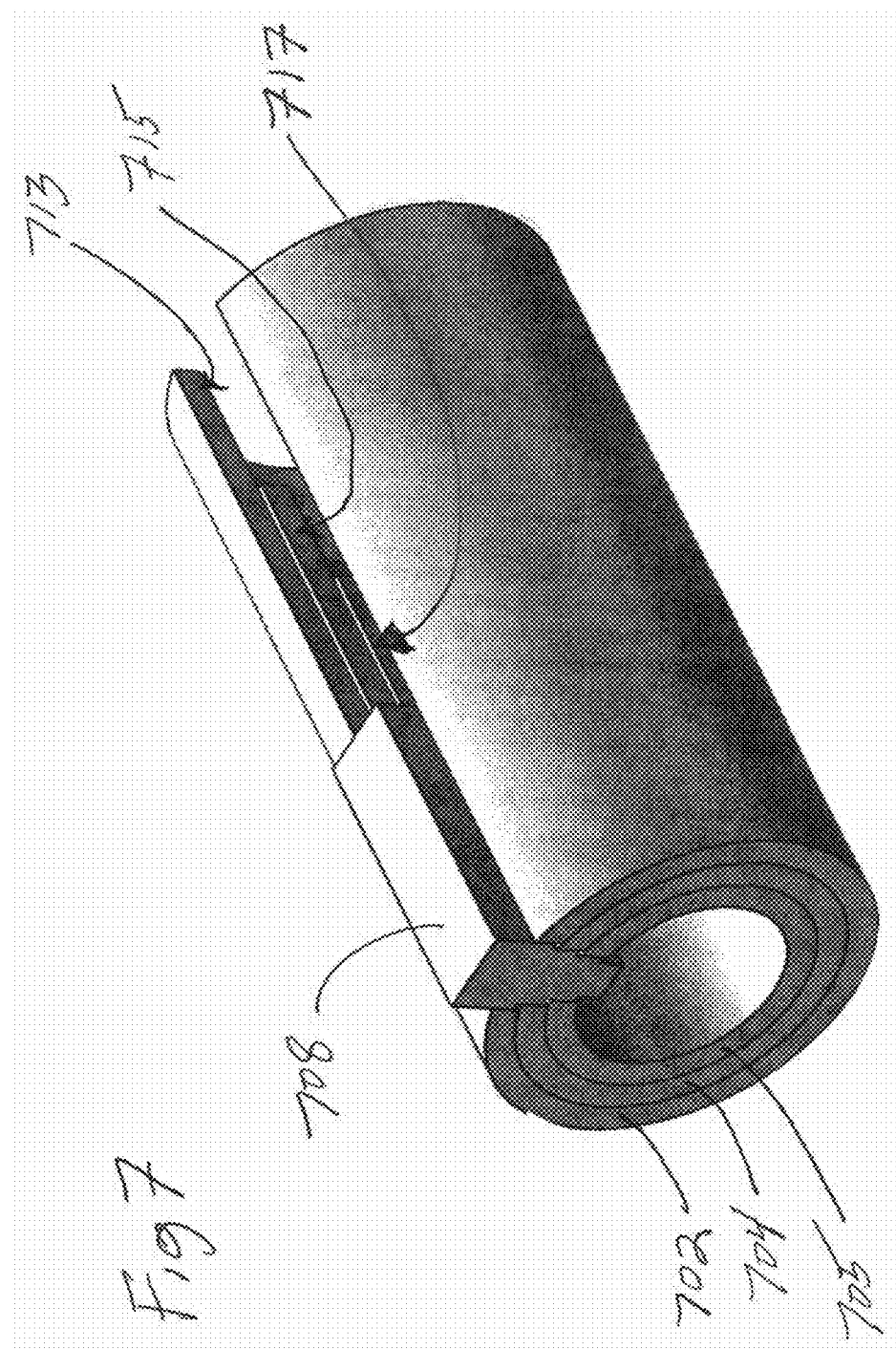
FIG. 7 is a perspective illustration of another embodiment according to the present invention.

FIG. 7 is perspective illustration of another embodiment of the present invention that is configured to step-up or otherwise adapt the outer diameter and keyed-seat dimensions of a keyed motor shaft workpiece three-steps to a larger-bored, interior cylindrical surface of another internally-bored and keyed shaft or rotating machine element. In assembly an outermost sleeve 702 is disposed about another sleeve 704, which is disposed about another sleeve 705, each sleeve having tubular shapes defined by respective interior and exterior cylindrical surfaces that are defined by different respective radial distances from a common assembly axis AA, wherein the respective cylindrical surface dimensions of the sleeves 702, 704 and 705 are selected to match and thereby fit about or within respective matching cylindrical surface dimensions of corresponding other ones of the sleeves with a desired or required tolerance to form the assembly depicted within FIG. 7. The thickness of each of the sleeves 702, 704 and 705 (as defined by differences between their respective interior and exterior cylindrical surfaces) is selected to step-up a dimensional size, or to adapt between different IEC or NEMA dimensions, etc., to thereby allow for differences in either size or dimensional standards.

Figure 8:
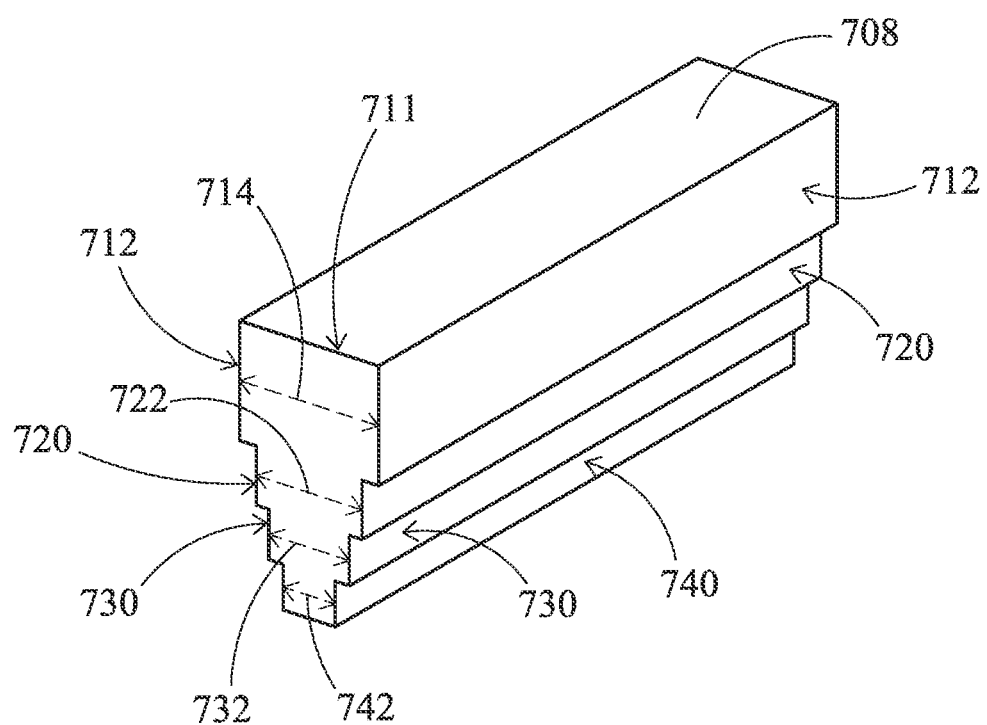
FIG. 8 is a perspective illustration of another embodiment according to the present invention.

With reference to both FIG. 7 and FIG. 8, a four-step key 708 is configured with four different sets (or steps) of paired sidewalls, presenting a stepped cross-sectional shape/profile 711 defined by: an upper-most pair of outer side wall portions 712 located a width dimension 714 apart that is selected to within an aperture of the outer sleeve 702 that is defined by opposing end/sidewalls 713 of the sleeve 702, and to fit within a corresponding key seat structure (not shown) defined within a workpiece internally-bored shaft or rotating machine element inner cylindrical surface (not shown), as described generally above with respect to the embodiments of FIGS. 1-6; an upper-middle pair of outer side wall portions 720 located a width dimension 722 apart that is selected to fit within an aperture of the inner sleeve 704 that is defined by opposing end/sidewalls 715 of the inner sleeve 704; a lower-middle pair of outer side wall portions 730 located a width dimension 732 apart that is selected to fit within an aperture of inner-most sleeve 705 that is defined by opposing end/sidewalls 717 of the inner-most sleeve 705; and a lowest pair of outer side wall portions 740 located a width dimension 742 apart that is selected to fit within a corresponding key seat structure (not shown) defined within a workpiece keyed-shaft (not shown), as described generally above with respect to the embodiments of FIGS. 1-6.

Pursuant to the assembly of FIG. 7, via engaging the respective workpiece seat structures, the stepped key 708 transmits input speed and torque from the rotating workpiece shaft to the workpiece rotating shaft or machine element, as will be readily appreciated by one skilled in the art. The sleeve 702, 704 and 705 tubular shape width dimensions are selected to correspond to (for example, to equal within a specified tolerance) differences between respective radius dimensions of cylindrical surfaces of each other and of the workpiece motor shaft and the inner cylindrical surface of the workpiece rotating shaft or machine element, to eliminate misalignment or other performance problems that would otherwise arise between differences in these dimensions during speed or torque transmission operations.

One illustrative but not limiting or exhaustive example of the embodiment of FIG. 7 is designed to "step up" an input motor keyed shaft workpiece having a ⅞ inch outer diameter three sizes, through an intervening 1⅛ inch diameter size provided by the outer diameter of the inner-most sleeve 705, an intervening 1⅜ inch diameter size provided by the outer diameter of the middle sleeve 704, and into engage with another workpiece shaft or rotating element having an internally-bored diameter of 1⅝ inch and a key seat formed therein, via outer-most sleeve 702 which has a corresponding outer surface diameter of 1⅝ inch. As with the example of FIGS. 5 and 6, the sleeves 702, 704 and 705 are configured to have internal and external cylindrical surfaces located on dimensions selected to form an acceptable engagement, within tolerance, with the surface of the workpiece shafts and each other. In one example, the upper-most pair of outer side wall portions 712 of the four-step key 708 are located apart a width dimension 714 of about 0.375 inches; the upper-middle pair wall portions 720 are located apart a width dimension 722 of about 0.313 inches; the lower-middle pair wall portions 730 are located apart a width dimension 732 of about 0.25 inches; and the lowest pair of outer side wall portions 740 are located apart a width dimension 742 of 0.19 inches.

Figure 9A:
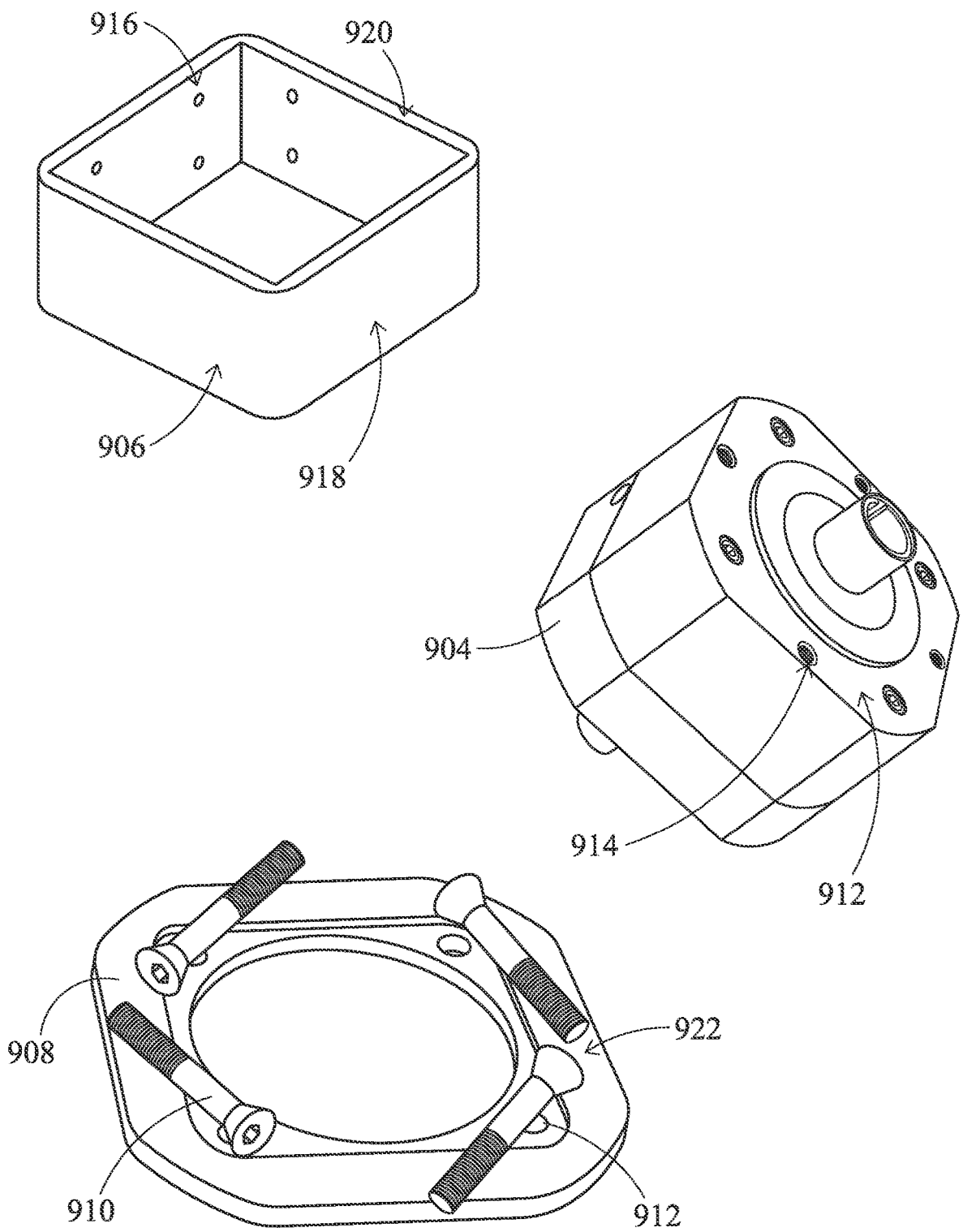
FIGS. 9A and 9B are perspective illustrations of elements of another embodiment according to the present invention.
Figure 9B:
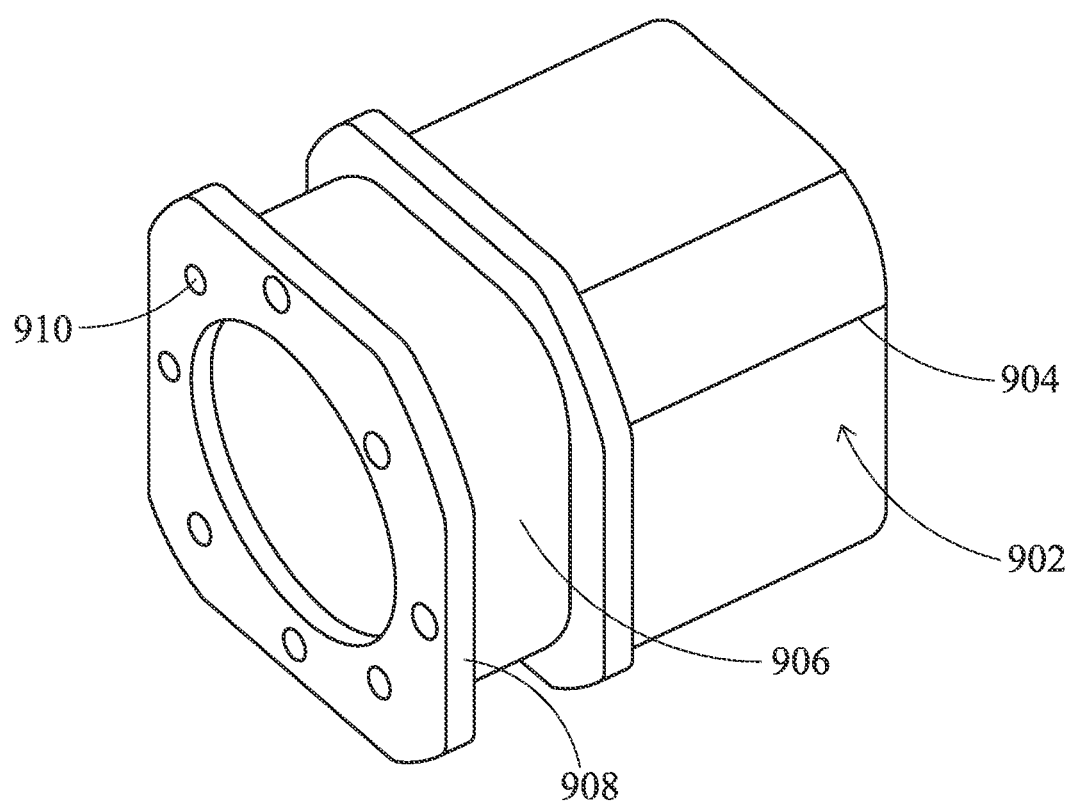

FIG. 9A provides perspective views of a structural tubing section 906 and an adapter flange 908 according to the present invention, and a workpiece gearhead 904. The structural tubing section 906 and an adapter flange 908 are configured to form an assembly in engagement with a workpiece gearhead or motor, inclusive of an exemplary gearhead 904 depicted in the view, as illustrated in the assembly 902 depicted in FIG. 9B of the structural tubing section 906, the adapter flange 908 and the workpiece gearhead 904, wherein the frame adapter assembly 902 is adapted to incorporate the motor shaft adapter systems and components described above and illustrated by one or more of FIGS. 1-8 in operatively connecting a shaft of the gearhead 904 to the shaft of a motor (not shown).

The assembly 902 is formed by passing a set of threaded bolts 910 through bolt apertures (holes) 912 formed within the body of the flange 908, and through a central void or area 916 of the tubing section 906 defined by the four walls 918 of the square tube section 906, and threading (rotating, screwing) the bolts 910 into corresponding threaded holes 914 on an engaging face of the gearhead 910, which causes the heads of the bolts 910 to compel an engaging square edge face 920 of the structural tubing section 906 into engagement with a recessed pocket 922 formed on an inner face of the flange 908 that is defined by inner edge walls in an alignment that mates (conform) to form elements (a physical shape) of the structural tubing section 906 square edge face 920 within a specified or desired tolerance. Thus, in assembly as described above, engagement of the square edge face 920 with the recessed pocket 922 transfers rotational forces between the flange 908 and the tubing section 906, including torque forces imparted to either of the tubing section 906 and the flange 908 by rotation of at least one of a pair of engaged respective shafts of a workpiece motor and a workpiece gearhead, wherein the shafts and apparatus linking the shafts (inclusive of the shaft adapter structures described above) are located within the central void of the tubing section 906 as assembled to the flange 908, and the flange 908 is attached to a faceplate or other structure fixed to one of the workpiece motor and a workpiece gearhead.

Figure 10:
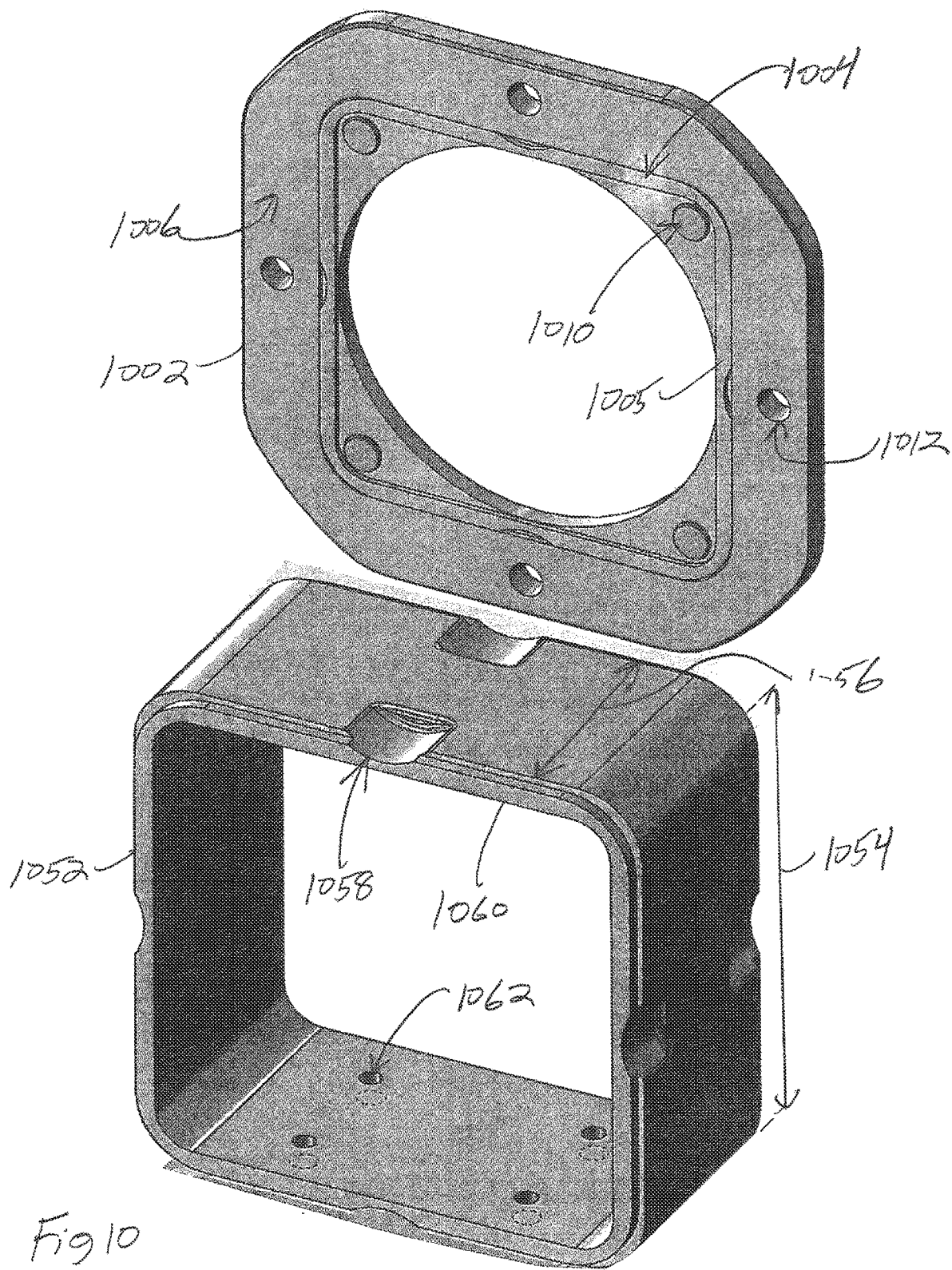
FIG. 10 is a perspective illustration of another embodiment according to the present invention.

FIG. 10 provides perspective views of alternative flange 1002 and structural tubing section 1052 embodiments according to the present invention. The generally square adaptor flange 1002 is configured for use as a NEMA 56 frame adapter and includes a machined recessed pocket area 1004 on an inner face 1006 that is defined by compound inner edges 1005 that are aligned (sized or configured) relative to each other to accept and engage projecting pilot lip or wall feature 1060 of a mating edge of the square structural tubing section 1052 within a specified or desired tolerance. The flange 1002 includes a plurality of bolt holes 1010 for accepting bolts to pass through and form an assembly with the structural tubing section 1052 on one of a paired workpiece gearhead and motor, as described above with respect to FIG. 9; and flange mounting holes 1012 for attaching the flange to an other, remaining one of the paired workpiece gearhead and motor.

The square structural tubing section 1052 is defined by four sides having generally uniform length 1054 and depth 1056 dimensions; one illustrative but not limiting or exhaustive example has side dimensions 1054 of five inches and a depth dimension 1056 of 0.25 inches. Pockets 1058 are machined or otherwise formed on the sides of the tubing section 1054 to provide clearance for using an open-end wrench or other tool to secure hex bolts in mounting an assembly of the section 1052 and the flange 1002 to a workpiece motor or gearhead. Additional mounting holes 1062 are also provided to attach to a bracket or other supporting structure.

Figure 11C:
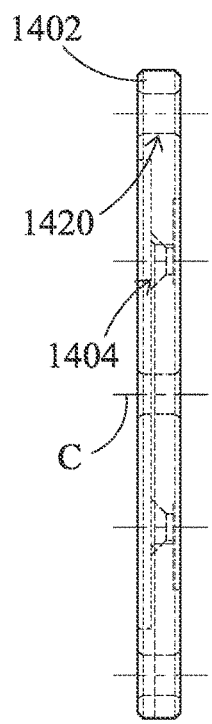
FIG. 11C is a side view of the flange of FIG. 11A.
Figure 11D:
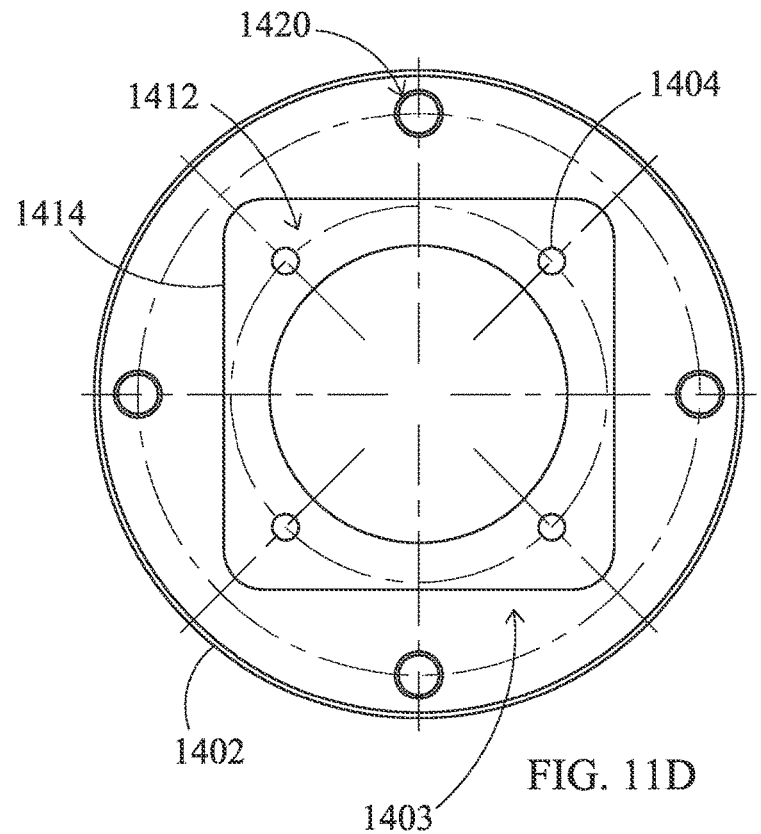
FIG. 11D is a front view of the flange of FIG. 11A.
Figure 11E:
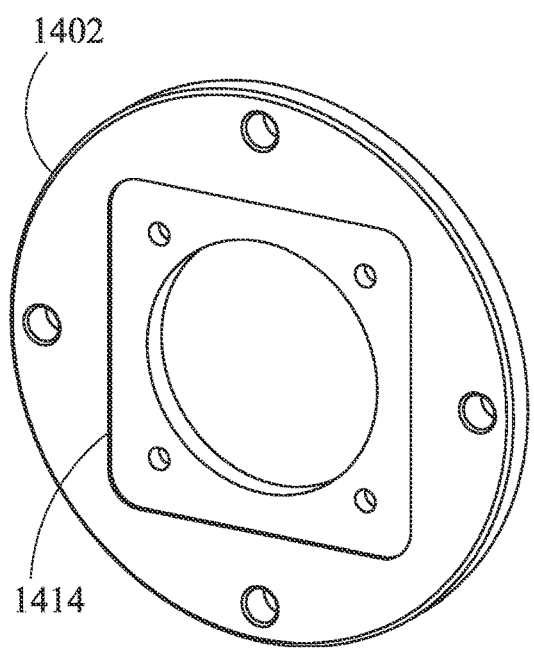
FIG. 11E is a perspective view of the front side of the flange of FIG. 11A.
Figure 11F:
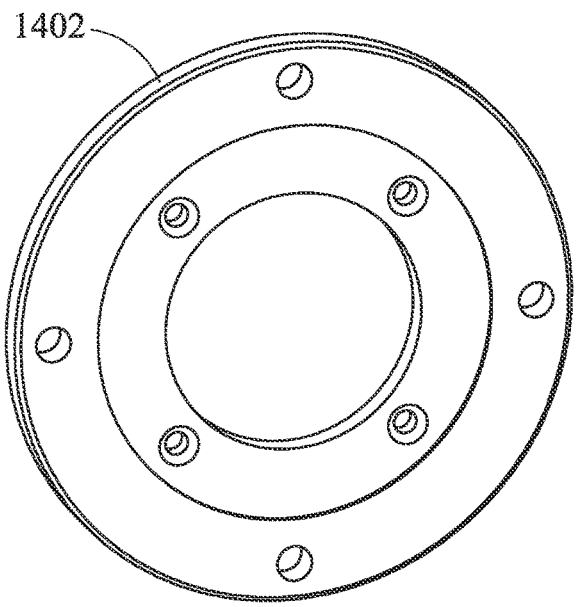
FIG. 11F is a perspective view of the back side of the flange of FIG. 11A.

FIG. 11A is a back view of a generally circular flange 1402 according to the present invention; FIG. 11B is a sectional view of the flange 1402 taken along the line indicated in FIG. 14A; FIG. 11C is a side view of the flange 1402; FIG. 11D is a front view of the flange 1402; FIG. 11E is a perspective view of showing the front side of the flange 1402; and FIG. 11F is a perspective view of showing the back side of the flange 1402.

A circular center aperture 1410 is defined relative to a central axis C of the flange 1402, for enabling workpiece shafts and shaft adapters according to the present invention to freely move and operate therein. In one illustrative but not exhaustive example the aperture 1410 has a diameter of 4.50 inches.

A first plurality of four assembly bolt holes 1404 is formed through the flange 1402 along a first radius 1405 from the central axis C. The radius 1405 is selected to locate each of the assembly bolt holes 1404 within a machined recessed pocket 1412 formed on the/front face 1403 of the flange 1402 that is defined by four inner edges 1414 that are aligned relative to each other to accept and engage outer faces of a square structural tubing section (for example, the square section 906 of FIG. 9 or square structural tubing section 1202 of FIG. 12) within a specified or desired tolerance. Recesses 1406 are optionally formed on the back side face about the assembly bolt holes 1404 to accept heads on assembly bolts. Thus, four (or less) threaded bolts deployed one each through the assembly bolt holes 1404 from the back side and through a square section 906 or 1202 and screwed (rotated) into corresponding threaded holes on a receiving workpiece one of a gearhead and motor generate an assembly of the square tube section 906 or 1202 and flange 1402 onto the receiving workpiece.

A second plurality of four flange mounting bolt holes 1420 is formed through the flange 1402 along a second radius 1422 from the central axis C. The second radius 1422 is selected to locate each of the flange mounting bolt holes 1420 outside of the machined recessed pocket 1412. Thus, four (or less) threaded bolts deployed one each through the flange mounting bolt holes 1420 from the front side and screwed (rotated) into corresponding threaded holes on a receiving remaining other one of the workpiece gearhead and motor attach the assembly of the square tube section and flange onto the remaining, other gearhead and motor, and wherein shafts of the respective workpiece motor and gearhead may be connected to each via the shaft adapter assembly described above with respect to FIGS. 1-8.

Figure 12A:
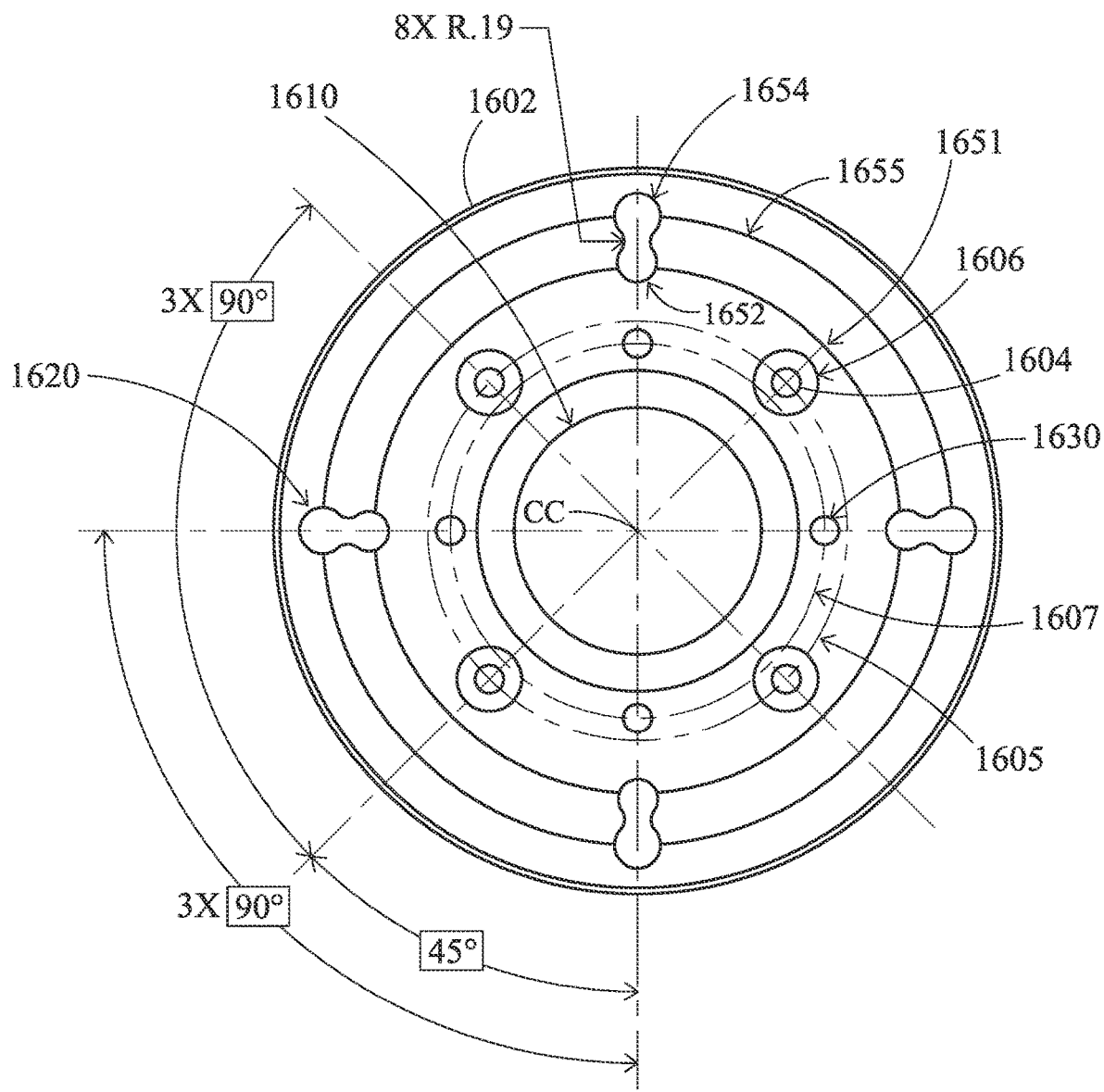
FIG. 12A is a back view of a generally circular flange according to the present invention.
Figures 12B, 12C:
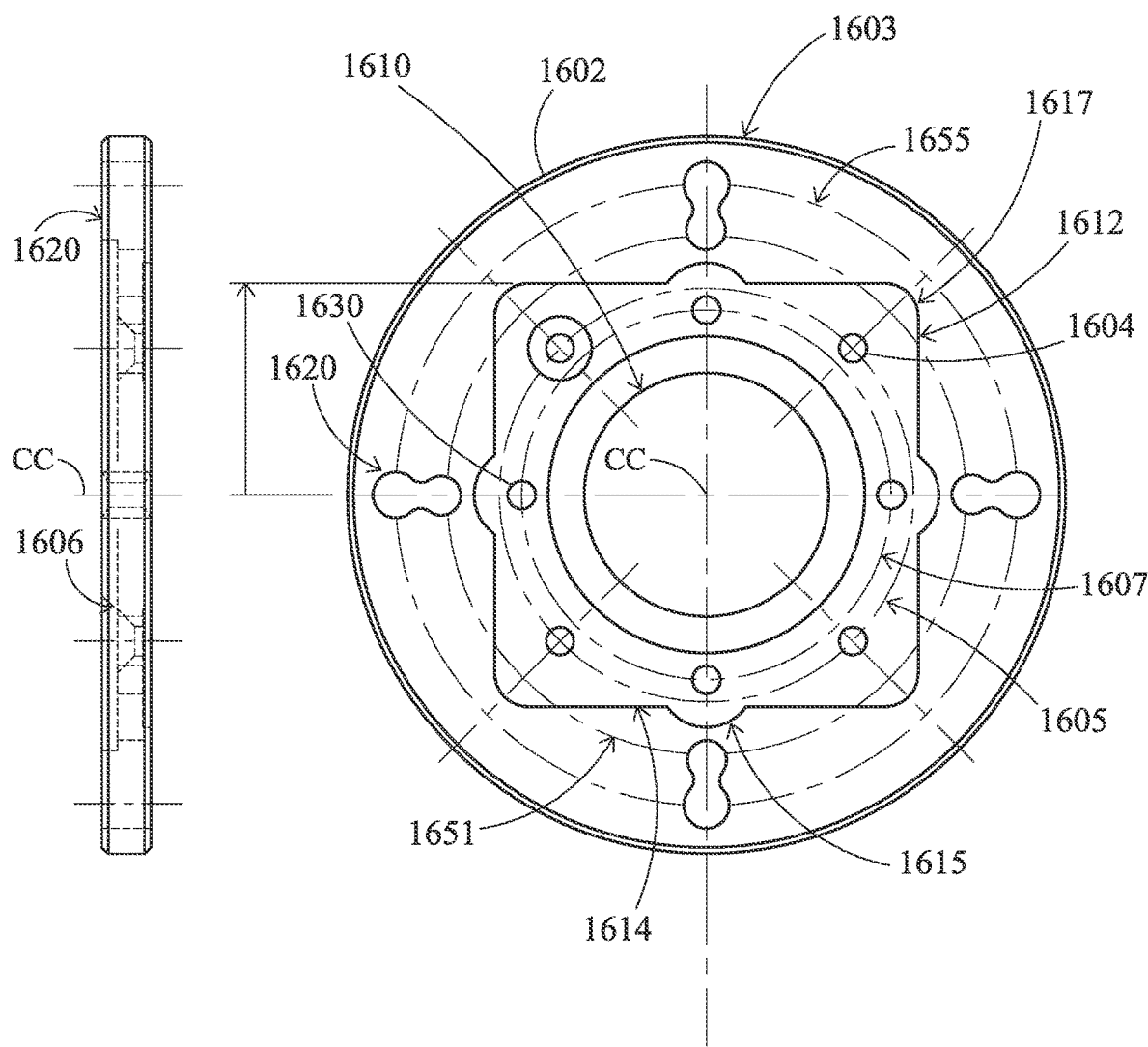
FIG. 12B is a side view of the flange of FIG. 12A.
FIG. 12C is a front view of the flange of FIG. 12A.
Figure 12D:
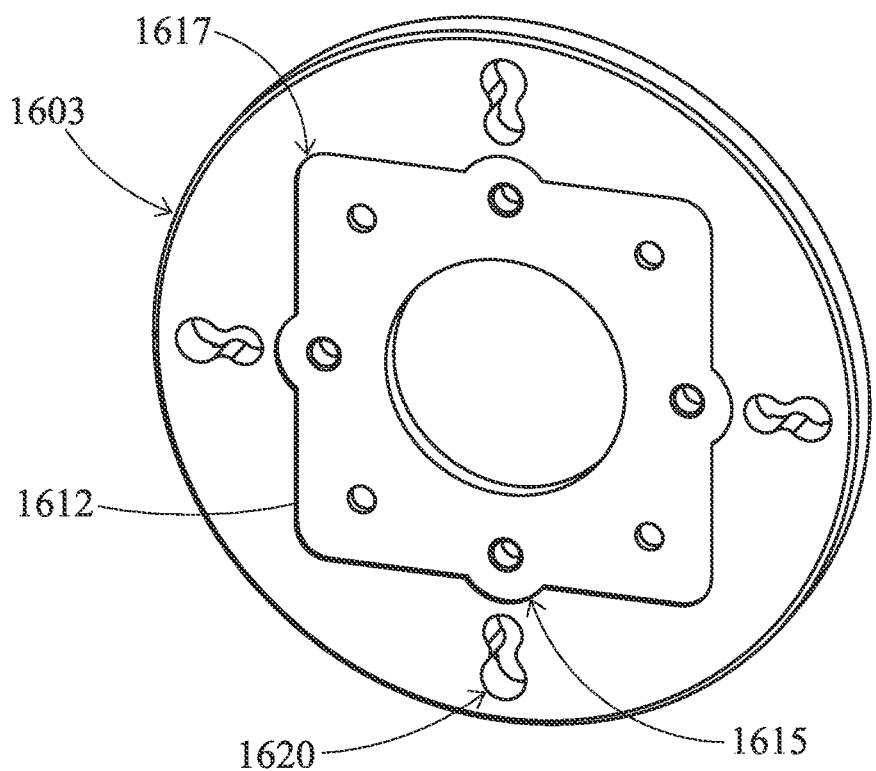
FIG. 12D is a perspective view of the front side of the flange of FIG. 12A.
Figure 12E:
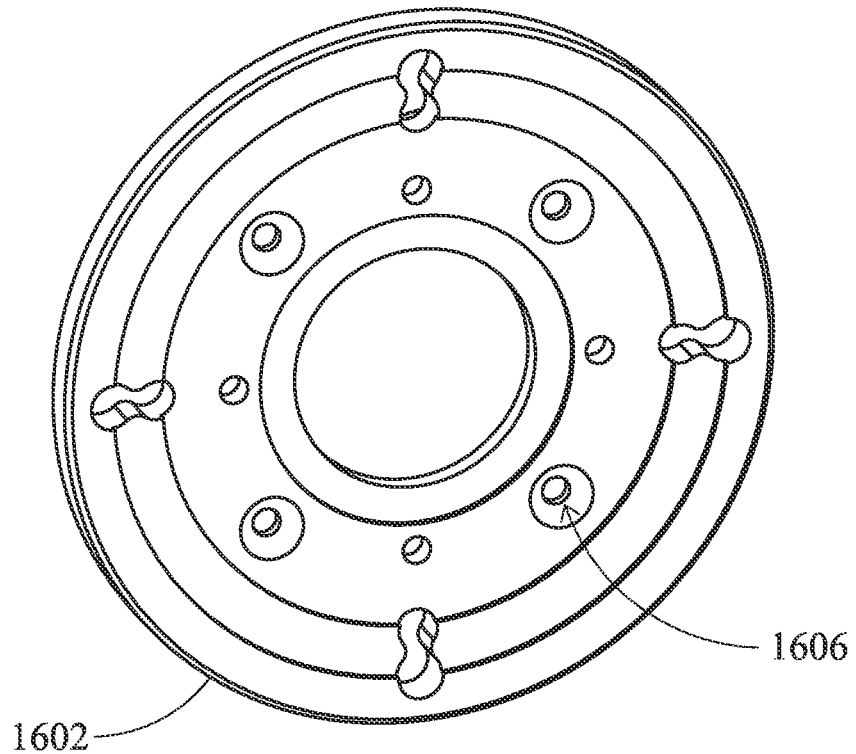
FIG. 12E is a perspective view of the back side of the flange of FIG. 12A.

FIG. 12A is a back view of another generally circular flange 1602 according to the present invention; FIG. 12B is a side view of the flange 1602; FIG. 12C is a front view of the flange 1602; 12D is a perspective view of showing the front side of the flange 1602; and FIG. 12E is a perspective view of showing the back side of the flange 1602. A circular center aperture 1610 is defined relative to a central axis CC of the flange 1602, for enabling workpiece shafts and shaft adapters according to the present invention to freely move and operate therein. In one illustrative but not exhaustive example the aperture 1610 has a diameter of 3.38 inches.

A first, outermost plurality of assembly bolt holes 1604 is formed through the flange 1602 along a first radius 1605 from the central axis CC; and another, second plurality of innermost assembly bolt holes 1630 is formed through the flange 1602 along a smaller radius 1607 from the central axis CC. The radii 1605 and 1607 are selected to locate each of the assembly bolt holes 1604 and 1630 within a machined recessed pocket 1612 formed on the/front face 1603 of the flange 1602 that is defined by four inner edges 1614 that are aligned relative to each other to accept and engage outer faces of a square structural tubing section (for example, the square section 906 of FIG. 9 or square structural tubing section 1202 of FIG. 12) within a specified or desired tolerance. By providing two different, discrete sets of assembly bolt holes 1604 and 1630 on different locations (defined by the different radii 1605 and 1607) the flange 1602 is configured to attached to different sized workpiece gearhead or motor housings, and thus to different workpieces of different sizes, powers and capacities. Thus, one flange 1602 enables the attachment to different sized motors or gearheads, enabling one gearhead to be connected to different sized motors via an assembly according to the present invention, or enabling one motors to be connected to different sized gearheads, expanding the applications of a given gearhead and motor.

Recesses 1606 are optionally formed on the back side face about the assembly bolt holes 1604 to accept heads on assembly bolts.

Pockets 1615 are formed within each of the inner edge lines 1614 at generally a midpoint of each inner edge lines 1614, the pocket 1615 defined by sidewalls arranged to conform to the intersecting corners of the square tube section 906 or 1202, in order to provide addition clearance spacing about, and in some embodiments to conform to and engage, the outer corners of the intersections of the sides of the square tube section 906 or 1202. This enable the square section to be attached to one of two positions: (i) with the square tube sides aligned (parallel to) the inner edge lines, wherein the four corners formed by intersections of the four sides of the square tube sections 906 or 1202 are aligned within the corner regions 1617 of the intersections of the four inner edges 1614; or (ii) the square edge of the square section is rotated by forty-five degrees relative to alignment to the four inner edges 1614, wherein the four corners formed by intersections of the four sides of the square tube sections 906 or 1202 are aligned within the each of the pockets 1615.

The structural integrity of an assembly to a work piece motor and interfacing gearhead may be improved by selectively choosing between the two alignments (i) and (ii) described above; for example, choosing the one of the (i) and (ii) alignments that aligns two opposing corners formed by intersections of the four sides of the square tube sections 906 or 1202 along a plane parallel to directional torque forces created through operation of the assembly. Thus, by enabling selective rotational realignment of the square tube section 906 or 1202 in 45 degree increments relative to the central axis CC, the flange 1602 enables selection of a more optimum, stronger alignment in assembly relative to the flange 1402, or to prior art structures.

In the present example the six assembly bolt holes 1604 allows for different combinations and orientations of four (or less) threaded bolts deployed one each through four of the assembly bolt holes 1604 from the back side and through a square section 906 or 1202 and screwed (rotated) into corresponding threaded holes on a receiving workpiece one of a gearhead and motor generate an assembly of the square tube section 906 or 1202 and flange 1602 onto the receiving workpiece.

Four compound or double-holed flange mounting apertures 1620 are formed through the flange 1602, wherein each of the compound flange mounting apertures 1620 has an inner circular aperture 1652 (defined on an inner aperture radius 1651 from the central axis CC) adjacent to an outer circular aperture 1654 (defined on an outer aperture radius 1655 from the central axis CC). The inner aperture radius 1651 and outer aperture radius 1655 are selected to locate each of the double-holed flange mounting apertures 1620 outside of the machined recessed pocket 1612. Thus, threaded bolts may be deployed within each of the mounting apertures 1620 to engage either the inner circular aperture 1652 or the outer circular aperture 1654, correspondingly increasing the possibilities of alignment to different sized workpieces in mounting the flange 1602 into corresponding threaded holes on a receiving one of a workpiece gearhead and motor, in order to create an assembly with a square tube section and flange onto the remaining, other gearhead and motor, and wherein shafts of the respective workpiece motor and gearhead may be connected to each via the shaft adapter assembly described above with respect to FIGS. 1-8.

While example described above are configured to align with square tube sections (for example, the sections 906 or 1202), one skilled in the art will appreciate that embodiments may also be conformed to form assemblies with round, tubular sections (not shown), or elements with triangular cross-sections shapes (not shown), and still other possible configurations will be apparent to one skilled in the art.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    a cylindrical shaft sleeve comprising a tubular body defined between an inner cylindrical surface and an outer cylindrical surface;
    a first key slot aperture defined by opposing body end-walls of the tubular body and through the inner cylindrical surface and the outer cylindrical surface;
    a shaft key comprising outer sidewalls, wherein the outer sidewalls comprise a pair of opposing outer sleeve aperture sidewall portions that are located a sleeve aperture width apart that is selected to enable the shaft key outer sleeve aperture sidewall portions to fit within the first key slot aperture and to thereby engage the opposing body end-walls of the first key slot aperture; and
    the shaft key outer sidewalls further comprising a base pair of opposing key seat engagement portions that are located a key seat width apart that is selected to enable the base pair of opposing key seat engagement portions to fit within opposing sidewalls of a key seat aperture that is defined within a workpiece motor shaft located within the cylindrical shaft sleeve tubular body and to thereby engage the opposing sidewalls of the workpiece shaft key seat aperture;
    wherein the sleeve inner cylindrical surface defines a central cylindrical aperture on an inner surface radius from a central cylindrical axis of the sleeve that is selected to correspond to a radius of an outer cylindrical surface of the workpiece motor shaft so that the sleeve inner cylindrical surface fits over and engages the cylindrical outer surface of the workpiece motor shaft;
    wherein the sleeve outer cylindrical surface is defined on an outer surface radius from the central cylindrical axis of the sleeve that is larger than the inner surface radius and is selected to align the sleeve outer cylindrical surface to correspond to a radius of an inner cylindrical surface of a rotating machine element of a workpiece gearhead, so that the sleeve outer cylindrical surface fits within and engages the inner cylindrical surface of the rotating machine element and
    wherein, in response to rotation of the workpiece motor shaft by a workpiece motor with an input rotation speed and an input torque, engagement of the workpiece shaft key seat aperture opposing sidewalls with the shaft key base pair of outer sidewall opposing key seat engagement portions, engagement of the shaft key outer sleeve aperture sidewall portions with the opposing body end-walls of the first key slot aperture, and engagement of the sleeve outer cylindrical surface with the inner cylindrical surface of the rotating machine element cause the sleeve and shaft key to drive the workpiece rotating machine element of the workpiece gearhead into an output rotation having an output rotation speed and an output torque.

2. The apparatus of claim 1, wherein a first tolerance difference in dimension between the sleeve inner cylindrical surface radius and the workpiece motor shaft outer cylindrical surface radius, and a second tolerance difference in dimension between the sleeve outer cylindrical surface radius and the rotating machine element inner cylindrical surface radius are each selected to eliminate misalignment problems with respect to the workpiece motor shaft driving the workpiece rotating machine element to generate the output rotation having the output rotation speed and the output torque.

3. The apparatus of claim 1, further comprising:
the shaft key outer sidewalls further comprising a pair of upper opposing key seat engagement portions that are located an upper key seat width apart that is selected to enable the pair of upper shaft key seat engagement portions to fit within opposing sidewalls of another key seat aperture that is defined within the rotating machine element and to thereby engage the opposing sidewalls of the another key seat aperture that is defined within the rotating machine element; and
wherein engagement of the pair of upper shaft key seat engagement portions with the opposing sidewalls of the another key seat aperture that is defined within the rotating machine element causes the sleeve and shaft key to drive the workpiece rotating machine element into the output rotation having the output rotation speed and the output torque in response to the rotation of the workpiece shaft with the input rotation speed and the input torque.

4. The apparatus of claim 1, wherein the rotating machine element is a second cylindrical shaft sleeve comprising a second tubular body defined between a second inner cylindrical surface and a second outer cylindrical surface;
the apparatus further comprising a second key slot aperture defined by second opposing body end-walls of the second tubular body and through the second inner cylindrical surface and the second outer cylindrical surface;
wherein the shaft key outer sidewalls comprise another pair of opposing outer sleeve aperture sidewall portions that are located another sleeve aperture width apart that is selected to enable the another pair of opposing outer sleeve aperture sidewall portions to fit within the second key slot aperture and to thereby engage the second opposing body end-walls of the second key slot aperture via a key body disposed therein that is selected from the shaft key and a second shaft key; and
wherein engagement the another pair of opposing outer sleeve aperture sidewall portions with the second opposing body end-walls of the second key slot aperture via the key body causes at least one of the sleeve and the shaft key to drive the workpiece rotating machine element into the output rotation having the output rotation speed and the output torque in response to the rotation of the workpiece shaft with the input rotation speed and the input torque.

5. The apparatus of claim 4, further comprising
a flange attached to one of the workpiece gearhead and the workpiece motor;
a section of structural tubing that is disposed about the cylindrical shaft sleeve, the shaft key, the key body, the workpiece motor shaft and the rotating machine element;
the structural tubing having an edge face; and
a recessed pocket defined on a face of the flange comprising inner edge walls that engage form elements of the structural tubing edge face within a specified tolerance, said engagement transferring rotational torque forces between the flange and the structural tubing imparted to either of the structural tubing section and the flange from the output torque of the workpiece shaft.

6. The apparatus of claim 5, further comprising:
a plurality of threaded bolts disposed through a set of bolt apertures formed within the flange and through a central void of the structural tubing section that is disposed about the cylindrical shaft sleeve, the shaft key, the key body, the workpiece motor shaft and the rotating machine element;
wherein rotating the plurality of threaded bolts into corresponding threaded holes on an engaging face of the one of the workpiece gearhead and the workpiece motor that is attached to the flange causes heads of the bolts to compel the structural tubing edge face into the engagement with the recessed pocket defined on the face of the flange transferring the rotational torque forces between the flange and the structural tubing.

7. The apparatus of claim 6, wherein the structural tubing is square structural tubing;
the structural tubing section edge face comprises four linear edges projecting into a square shape; and
the inner edge walls of the recessed pocket defined on the face of the flange comprise four linear walls that are each aligned to engage one each of the four linear edges projecting from structural tubing edge face within the specified tolerance.

8. The apparatus of claim 7, wherein the inner edge walls of the recessed pocket defined on the face of the flange comprise midpoint pocket structures that are configured to align with respective corners of the four linear edges projecting from structural tubing edge face within the specified tolerance, and thereby enable the recessed pocket defined on the face of the flange to engage the four linear edges projecting from structural tubing edge face in a position that is rotated about 45 degrees from a parallel alignment of the four linear walls to engaged ones each of the four linear edges projecting from structural tubing edge face.

9. The apparatus of claim 7, wherein the section of square structural tubing is a section of American Society for Testing and Materials (ASTM) standard A500 square structural tubing having 5 inch sides of the square shape and a 0.25-inch-deep length dimension.

10. A method, comprising:
within a cylindrical shaft sleeve comprising a tubular body defined between an inner cylindrical surface and an outer cylindrical surface, defining a first key slot aperture within opposing body end-walls of the tubular body and through the inner cylindrical surface and the outer cylindrical surface;
a shaft key comprising outer sidewalls engaging opposing body end-walls of the first key slot aperture, wherein the outer sidewalls comprise a pair of opposing outer sleeve aperture sidewall portions that are located a sleeve aperture width apart that enables the shaft key outer sleeve aperture sidewall portions to fit within the first key slot aperture; and
fitting a base pair of opposing key seat engagement portions of the shaft key outer sidewalls that are located a key seat width apart within opposing sidewalls of a key seat aperture that is defined within a workpiece motor shaft located within the cylindrical shaft sleeve tubular body, the base pair of opposing key seat engagement portions thereby engaging the opposing sidewalls of the workpiece shaft key seat aperture;
wherein the sleeve inner cylindrical surface defines a central cylindrical aperture on an inner surface radius from a central cylindrical axis of the sleeve that is selected to correspond to a radius of an outer cylindrical surface of the workpiece motor shaft so that the sleeve inner cylindrical surface fits over and engages the cylindrical outer surface of the workpiece motor shaft;

wherein the sleeve outer cylindrical surface is defined on an outer surface radius from the central cylindrical axis of the sleeve that is larger than the inner surface radius and is selected to align the sleeve outer cylindrical surface to correspond to a radius of an inner cylindrical surface of a rotating machine element of a workpiece gearhead, so that the sleeve outer cylindrical surface fits within and engages the inner cylindrical surface of the rotating machine element; and causing the sleeve and shaft key to drive the workpiece rotating machine element of the workpiece gearhead into an output rotation having an output rotation speed and an output torque in response to rotation of the workpiece motor shaft by a workpiece motor with an input rotation speed and an input torque, engagement of the workpiece shaft key seat aperture opposing sidewalls with the shaft key base pair of outer sidewall opposing key seat engagement portions, engagement of the shaft key outer sleeve aperture sidewall portions with the opposing body end-walls of the first key slot aperture, and engagement of the sleeve outer cylindrical surface with the inner cylindrical surface of the rotating machine element.

11. The method of claim 10, further comprising:
selecting a first tolerance difference in dimension between the sleeve inner cylindrical surface radius and the workpiece motor shaft outer cylindrical surface radius, and a second tolerance difference in dimension between the sleeve outer cylindrical surface radius and the rotating machine element inner cylindrical surface radius to eliminate misalignment problems with respect to the workpiece motor shaft driving the workpiece rotating machine element to generate the output rotation having the output rotation speed and the output torque.

12. The method of claim 10, wherein the shaft key outer sidewalls further comprises a pair of upper opposing key seat engagement portions that are located an upper key seat width apart that is selected to enable the pair of upper shaft key seat engagement portions to fit within opposing sidewalls of another key seat aperture that is defined within the rotating machine element and to thereby engage the opposing sidewalls of the another key seat aperture that is defined within the rotating machine element; and wherein engagement of the pair of upper shaft key seat engagement portions with the opposing sidewalls of the another key seat aperture that is defined within the rotating machine element causes the sleeve and shaft key to drive the workpiece rotating machine element into the output rotation having the output rotation speed and the output torque in response to the rotation of the workpiece shaft with the input rotation speed and the input torque.

13. The method of claim 10, wherein the rotating machine element is a second cylindrical shaft sleeve comprising a second tubular body defined between a second inner cylindrical surface and a second outer cylindrical surface, the method comprising:

defining a second key slot aperture by second opposing body end-walls of the second tubular body and through the second inner cylindrical surface and the second outer cylindrical surface;

defining another pair of opposing outer sleeve aperture sidewall portions within the shaft key outer sidewalls that are located another sleeve aperture width apart that is selected to enable the another pair of opposing outer sleeve aperture sidewall portions to fit within the second key slot aperture and to thereby engage the second opposing body end-walls of the second key slot aperture via a key body disposed therein that is selected from the shaft key and a second shaft key; and the shaft key to driving the workpiece rotating machine element into the output rotation having the output rotation speed and the output torque in response to rotation of the workpiece shaft with the input rotation speed and the input torque and engagement of the another pair of opposing outer sleeve aperture sidewall portions with the second opposing body end-walls of the second key slot aperture via the key body.

14. The method of claim 13, further comprising
attaching a flange to one of the workpiece gearhead and the workpiece motor;

disposing a section of structural tubing about the cylindrical shaft sleeve, the shaft key, the key body, the workpiece motor shaft and the rotating machine element, the structural tubing having an edge face defined by form elements;

a recessed pocket defined on a face of the flange comprising inner edge walls engaging the form elements of the structural tubing edge face within a specified tolerance; and the engaging the form elements transferring rotational torque forces between the flange and the structural tubing imparted to either of the structural tubing section and the flange from the output torque of the workpiece shaft.

15. The method of claim 14, further comprising:
disposing a plurality of threaded bolts through a set of bolt apertures formed within the flange and through a central void of the structural tubing section that is disposed about the cylindrical shaft sleeve, the shaft key, the key body, the workpiece motor shaft and the rotating machine element;

rotating the plurality of threaded bolts into corresponding threaded holes on an engaging face of the one of the workpiece gearhead and the workpiece motor that is attached to the flange causes heads of the bolts; and the rotating the bolts compelling the structural tubing edge face into the engagement with the recessed pocket defined on the face of the flange transferring the rotational torque forces between the flange and the structural tubing.

16. The method of claim 15, wherein the structural tubing is square structural tubing, and the structural tubing section edge face comprises four linear edges projecting into a square shape, further comprising:

aligning four linear walls of the inner edge walls of the recessed pocket defined on the face of the flange to engage one each of the four linear edges projecting from structural tubing edge face within the specified tolerance.

17. The method of claim 16, wherein the inner edge walls of the recessed pocket defined on the face of the flange comprise midpoint pocket structures that are configured to align with respective corners of the four linear edges projecting from structural tubing edge face within the specified tolerance, further comprising:

the recessed pocket defined on the face of the flange engaging the four linear edges projecting from structural tubing edge face in a position that is rotated about 45 degrees from a parallel alignment of the four linear walls to engaged ones each of the four linear edges projecting from structural tubing edge face.

18. The method of claim 16, wherein the section of square structural tubing is a section of American Society for Testing and Materials (ASTM) standard A500 square structural tubing having 5 inch sides of the square shape and a 0.25-inch-deep length dimension.

* * * * *